US011629266B2

(12) United States Patent
Conner et al.

(10) Patent No.: US 11,629,266 B2
(45) Date of Patent: Apr. 18, 2023

(54) WATERBORNE COMPOSITION

(71) Applicants: Dow Global Technologies LLC, Midland, MI (US); Rohm and Haas Company, Collegeville, PA (US)

(72) Inventors: David M. Conner, Dresher, PA (US); Mark D. Westmeyer, Collegeville, PA (US); Robert Baumann, Rueschlikon (CH)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 199 days.

(21) Appl. No.: 17/274,160

(22) PCT Filed: Oct. 1, 2019

(86) PCT No.: PCT/US2019/053931
§ 371 (c)(1),
(2) Date: Mar. 5, 2021

(87) PCT Pub. No.: WO2020/076545
PCT Pub. Date: Apr. 16, 2020

(65) Prior Publication Data
US 2021/0238423 A1 Aug. 5, 2021

Related U.S. Application Data

(60) Provisional application No. 62/743,703, filed on Oct. 10, 2018.

(51) Int. Cl.
| | | |
|---|---|---|
| *C09D 133/02* | (2006.01) | |
| *C09D 183/08* | (2006.01) | |
| *C09D 183/12* | (2006.01) | |
| *C08F 212/08* | (2006.01) | |
| *C08F 220/06* | (2006.01) | |
| *C08G 77/26* | (2006.01) | |
| *C08L 25/14* | (2006.01) | |
| *C08L 33/10* | (2006.01) | |
| *C08L 83/08* | (2006.01) | |
| *C08L 33/04* | (2006.01) | |
| *C08L 33/02* | (2006.01) | |
| *C08G 77/46* | (2006.01) | |
| *C08J 3/03* | (2006.01) | |

(52) U.S. Cl.
CPC .......... *C09D 133/02* (2013.01); *C08F 212/08* (2013.01); *C08F 220/06* (2013.01); *C08G 77/26* (2013.01); *C08L 25/14* (2013.01); *C08L 33/02* (2013.01); *C08L 33/04* (2013.01); *C08L 33/10* (2013.01); *C08L 83/08* (2013.01); *C09D 183/08* (2013.01); *C09D 183/12* (2013.01); *C08G 77/46* (2013.01); *C08J 3/03* (2013.01)

(58) Field of Classification Search
CPC .. C09D 133/02; C09D 133/06; C09D 133/10; C09D 133/12; C09D 183/08; C08L 83/08; C08G 77/26
See application file for complete search history.

(56) References Cited

U.S. PATENT DOCUMENTS

| | | | |
|---|---|---|---|
| 4,246,029 A | 1/1981 | Sanders, Jr. | |
| 4,571,415 A | 2/1986 | Jordan, Jr. | |
| 5,494,961 A | 2/1996 | Lavoie et al. | |
| 5,616,764 A | 4/1997 | Lavoie et al. | |
| 5,672,379 A | 9/1997 | Schall et al. | |
| 5,820,993 A | 10/1998 | Schall et al. | |
| 6,011,109 A | 1/2000 | Brown | |
| 6,407,158 B1 * | 6/2002 | Kim ................. | C08G 18/0823 524/840 |
| 7,897,669 B2 | 3/2011 | Foerg et al. | |
| 2004/0053810 A1 | 3/2004 | Tully et al. | |
| 2013/0121948 A1 * | 5/2013 | Dussaud ................. | C08L 83/08 523/463 |
| 2013/0129648 A1 | 5/2013 | Nguyen et al. | |
| 2013/0143990 A1 | 6/2013 | Nercissiantz et al. | |
| 2015/0159036 A1 | 6/2015 | Murugesan et al. | |
| 2015/0166835 A1 | 6/2015 | Coffey et al. | |
| 2017/0119632 A1 | 5/2017 | Cox et al. | |
| 2017/0158823 A1 | 6/2017 | Dussaud et al. | |

FOREIGN PATENT DOCUMENTS

| | | | |
|---|---|---|---|
| DE | 19951877 A1 * | 3/2001 | |
| EP | 174806 A2 * | 3/1986 | |

OTHER PUBLICATIONS

Abstract for JP 10-053960 (Feb. 1998).*

* cited by examiner

Primary Examiner — Marc S Zimmer
(74) Attorney, Agent, or Firm — Zhiqiang Zhao

(57) ABSTRACT

A composition including: (a) at least one anionically stabilized acrylic polymer dispersion where the acrylic polymer contains acid monomer units; and (b) at least on polyamino siloxane relative to the weight of the total polymers in the composition, wherein the polyaminosiloxane copolymer containing steric stabilizing groups having a pendant group with a secondary or a primary amine functionality; and (ii) at least a portion of the silicon atoms in the polyaminosiloxane copolymer containing steric stabilizing groups having a pendant alkyl-poly(ethylene oxide) chain with 5 ethylene oxide units to 20 ethylene oxide units.

14 Claims, No Drawings

WATERBORNE COMPOSITION

FIELD

The present invention relates to a waterborne composition, and more specifically, the present invention relates to a waterborne composition of an anionically stabilized acrylic polymer dispersion and a polyaminosiloxane copolymer.

BACKGROUND

Heretofore, formulations utilizing silanes and/or silicone additives having been used, for example, for making dispersions, coatings, sealants, masonry finishes, and traffic markings. For instance, U.S. Provisional Patent Application No. 62/525,851, entitled STORAGE STABLE QUICKSETTING COATING SYSTEM THAT IS FREE OF VOLATILE-BASE, filed Jun. 28, 2017, by Katherine A. Faber et al. discloses, in Example 5, a hydrolysis-condensation product of aminoethyl aminopropyl trimethoxysilane in a dispersion formulation containing an anionic stabilized acrylic dispersion. The formulation has a neutral pH and is free of volatile base. The formulation performs well in achieving rapid setting with 0.22 percent (%) of a polymeric polyamine.

However, the formulation disclosed in the above provisional patent application reference consists of a homopolymer of aminoethyl aminopropyl trimethoxysilane which does not work to provide a stabilized dispersion because the aminosiloxane polymer disclosed in the above reference is a highly effective flocculent and will coagulate immediately upon addition to a formulation. Therefore, to prevent the occurrence of coagulation, the pH of the formulation containing such siloxane polymer must be increased substantially, i.e., to a pH of around 11, which is undesirable because to obtain a formulation at a pH of 11 requires diluting the formulation to an unacceptable level wherein the viscosity of the formulation becomes less than (<) 15 megapascals (MPa) (15,000 centipoise [cps]). Instead, the viscosity of the formulation disclosed in the above reference must be greater than (>) 15 MPa (15,000 cps) to provide a very thick, caulk-like formulation such that the formulation can achieve an extended storage stability and a rapid setting without the need for a volatile base. Below a viscosity of <15 MPa (15,000 cps), the formulation disclosed in the above reference fails.

It would be advantageous to provide a formulation that does not rely on a viscosity property for the formulation to work in the afore-mentioned applications. Without the viscosity limitation, such formulations with a viscosity lower than 15 MPa (15,000 cps) can be used in a wider number of applications including paints, varnishes, exterior finishing systems, coatings such as roof coatings, and traffic markings.

U.S. Pat. No. 5,672,379 discloses a method for producing a wear resistant traffic marking on a road surface by applying on said road surface a layer of a traffic paint coating composition containing an amino silane added to an aqueous evaporable carrier maintained at a pH in the range of from of 7.5 to 11.0. The coating composition includes dispersed particles of a latex binder bearing an acid functional pendant moiety and an enamine functional pendant moiety. The above patent discloses various amino silane molecules and structures; and refers to such amino silanes as "small molecules". And, while the above patent also mentions "oligomeric amino alkyl silanes", per the teachings in the above patent, the oligomers would be challenging to produce because the amino silane monomers disclosed in the patent are required to be mixed in the composition with other amino silane monomers only and not with other non-amino silane monomers. Nothing in the above patent teaches adding a non-amino silane monomer to the composition.

Other formulations utilizing silanes and/or silicone additives have been disclosed in the prior art including U.S. Pat. Nos. 5,616,764A; 6,011,109; and 4,246,029; and U.S. Patent Application Publication Nos. US20130129648A1, US20170119632A1, US20150159036A1, and US20040053810A1. However, none of the known formulations or compositions include an amino silane that, when added to non-amino silane materials, provides a formulation that exhibits an increase in beneficial properties such as rapid setting properties. In addition, none of the above references provide a composition that can be used in a wide scope of different applications, for example, dispersions, coatings, sealants, masonry finishes, and traffic markings.

SUMMARY

The present invention is directed to a waterborne acrylic formulation or composition including a stabilized latex or formulated products thereof; and a hydrophilic sterically stabilized polyaminosiloxane copolymer containing steric stabilizing groups useful for imparting rapid setting properties to the anionically stabilized latex or the formulated products thereof. The composition of the present invention may be useful, for example, for providing dispersions, coatings, masonry finishes, traffic markings and the like. Advantageously, the composition of the present invention sets faster than similar conventional waterborne counterparts; and thus, provides a coating that: (1) exhibits a rapid setting, (2) is re-coatable in less time, and (3) develops resistance to damage and marring sooner. And, for coatings or sealants in particular, the composition of the present invention provides early development of resistance against water washout; for example, water washout from rain water.

In one general embodiment, the present invention is directed to a formulation or composition including: (a) at least one acrylic polymer, wherein the at least one acrylic polymer comprises an anionically stabilized acrylic polymer dispersion and wherein the at least one acrylic polymer contains acid monomer units; and (b) at least one polyaminosiloxane copolymer containing steric stabilizing groups.

In another embodiment, the present invention includes a composition comprising: (a) at least one anionically stabilized acrylic polymer dispersion where the acrylic polymer contains acid monomer units; and (b) at least one polyaminosiloxane copolymer containing steric stabilizing groups, wherein the polyaminosiloxane copolymer containing steric stabilizing groups is characterized by: (i) a certain percentage of silicon atoms in the copolymer having a pendant group with a secondary and/or a primary amine functionality; and (ii) a certain percentage of silicon atoms in the copolymer having a pendant alkyl-poly(alkylene oxide such as ethylene oxide) chain with a number of ethylene oxide units.

The composition of the present invention containing a polyaminosiloxane copolymer-containing steric stabilizing groups is advantaged over known compositions and methods using amino silanes for achieving rapid setting because including in the polymer backbone a polyether glycol group imparts steric stabilization to the resulting setting accelerant compound. This imparted stability enables the use of such setting accelerant at a greater concentration in the composition which facilitates a shorter dry time for the composition. In addition, a more desirable formulation can be obtained because the pH at use of the formulation can be reduced, and thus formulations that have a lower odor and a higher solids content can be prepared. Furthermore, some embodiments of the present invention allow these sterically stabilized aminosiloxane additives to be used as setting accelerants at neutral pH which will induce setting without a pH triggered volatilization of base, for example ammonia flashing off after application of the composition.

In one preferred embodiment, the present invention includes, for example, a formulation or composition that includes siloxanes containing an amino silane co-polymerized with a silane monomer which does not contain amino groups for example dimethyldimethoxysilane. Stabilizing groups such as poly(ethylene glycols) are part of the polymer used in the composition; and such stabilizing groups reduce the charge density of the aminosiloxane and increases the stabilization. Thus, when the composition is used as a setting accelerant, the composition of the present invention can be much less susceptible to initiating an undesired flocculation when added to anionically stabilized latexes or formulated products thereof. The co-amino silanes of the present invention can be useful at lower pH and so the dispersion or formulation thereof requires less base which, in turn, lowers the odor of the composition and increases the solids content of the composition.

DETAILED DESCRIPTION

Definitions

"Stable", "stability", "stabilizing", or "product stability", with reference to a waterborne composition, herein refers to the ability to mix a setting accelerant into a dispersion or formulated product thereof; and to maintain a suitable workability of the mixture for the time required for application of the mixture. The mixture containing both the setting accelerant and the dispersion or formulation product thereof should maintain flow and viscosity; and should not congeal to a solid, form large agglomerations, form grit or micro-agglomerations for the time required for application of the mixture. Typically, at least 5 minutes (min) to several hours (hr) is required for application of the mixture. Large congealed agglomerations in the mixture may be visible during mixing; and grit or micron-sized micro-agglomerations can be detected by employing a fineness test procedure such as the fineness test procedure described in ASTM Test D-1316. The fineness of the mixture, as described in ASTM Test D-1316, should not increase by >5 micrometers (μm).

"Dry time", with reference to a waterborne composition, herein refers to the time required to reach "Stage D Dry-Through Time as described in ASTM Test D5895-13. Those skilled in the art will recognize that many factors such as temperature, humidity, formulation composition, solids, and composition application thickness, can impact the drying of waterborne dispersions or formulation products thereof. However, as aforementioned "dry time" of the waterborne composition of the present invention follows the description in ASTM Test D5895-13.

"Setting", or "setting time" or "time of setting", with reference to a waterborne composition, herein refers to the time required for a dispersion or formulated product thereof to provide resistance to mechanical deformation or water washout.

"Water washout", with reference to a waterborne composition, herein refers to the resistance of the composition to dissipation, loss of cohesion, or adhesion to the substrate by rain or by other natural or simulated precipitation.

"Rapid setting", with reference to a waterborne composition, herein refers to a reduction in the time required for a dispersion or formulated product thereof containing a setting accelerant to provide resistance to mechanical deformation or water washout versus the comparative time required for a dispersion or formulated product thereof without containing a setting accelerant to provide resistance to mechanical deformation or water washout; wherein the reduction in time is at least >25% in one embodiment, and >35% in another embodiment; wherein setting is measured as the time to achieved Stage D Dry-Through Time as described in ASTM test D5895-13; and wherein the testing of both the waterborne composition containing a setting accelerant and the comparative waterborne composition not containing a setting accelerant is conducted under the same drying conditions and the same film thickness.

"Flocculation", with reference to the waterborne composition, herein means a process by which particles or colloids dispersed in a liquid or a dispersion come out of suspension from such liquid or dispersion and stick to each other; and spontaneously form irregular larger-size particle clusters, flocs, aggregates or agglomerations. Flocculation is a result of insufficient stabilization of a composition and is undesirable before application of the composition. Flocculation is synonymous with agglomeration and coagulation.

"Micro-flocculation" or "micro-agglomeration", with reference to a waterborne composition, herein refers to hard or soft pack agglomerations that occur after addition of a setting accelerant to the composition and before application of the composition. Micro-agglomerations will lead to defects in a product containing such micro-agglomerations. And, although micro-agglomerations are <50 μm in size and will not hinder mixing or flow of the product, the presence of such micro-agglomerations result in visual blemishes in the product or reduce the final mechanical integrity of a product. Moreover, such micro-agglomerations could negatively impact the application of the product in, for example, spray applications.

"Gel" or "gelation", with reference to a waterborne composition, herein refers to a state, where upon addition of a setting accelerant to a dispersion or formulated product thereof, a significant volume fraction of the dispersion or formulated product thereof has congealed to a hard or soft pack; and the dispersion or formulated product thereof cannot be readily mixed. Gels or gelation occurring prior to application of the dispersion or formulated product thereof will render the dispersion or formulated product thereof unusable.

Generally, the present invention is directed to a stable waterborne composition that includes: (a) at least one acrylic polymer, wherein the at least one acrylic polymer comprises an anionically stabilized acrylic polymer dispersion and wherein the at least one acrylic polymer contains acid monomer units; and (b) at least one polyaminosiloxane copolymer containing steric stabilizing groups. The composition of the present invention of the present invention exhibits advantageous properties and benefits including, for example, increased stability, rapid setting, no flocculation, low pH, minimal use a base, low odor, and high solids contents.

As component (a), the formulation or composition of the present invention contains at least one anionically stabilized acrylic polymer dispersion and is used in water as a medium. The anionically stabilized acrylic polymer dispersion useful in the present invention can include, for example, polymers such as (meth)acrylic polymers, styrene-acrylic copolymers, and mixtures or blends thereof.

Exemplary of (meth)acrylic polymers present in the acrylic polymer dispersion include polymers comprising polymerized monomers selected from a group consisting of methyl acrylate, methyl methacrylate, ethyl acrylate, ethyl methacrylate, butyl acrylate, butyl methacrylate, 2-ethylhexyl acrylate, benzyl 2-propylacrylate, tert-butyl acrylate, ethyl 2-propylacrylate, isobornyl acrylate, isodecyl acrylate, lauryl acrylate, 3-(trimethoxysilyl)propyl acrylate, di(ethylene glycol) ethyl ether acrylate, trimethylolpropane triacrylate, 1,3-butanediol diacrylate, 1,6-hexanediol diacrylate, styrene, substituted styrene, acrylonitrile, methacrylonitrile, isobutyl methacrylate, n-hydroxyl(meth)acrylate, ethylhexyl (meth)acrylate, n-heptyl (meth)acrylate), ethyl(meth)acrylate, 2-methylheptyl (meth)acrylate, octyl (methyl)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, lauryl (meth)acrylate, tridecyl (meth)acrylate, stearyl (meth)acrylate, 3-(trimethoxysilyl)propyl methacrylate, glycidyl (meth)acrylate, alkyl crotonates, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxy-ethoxy)ethyl (meth)acrylate, 2 ethylhexyl (meth)acrylate, 2-propylheptyl (meth)acrylate, 2-phenoxyethyl (meth)acrylate, polypropyleneglycol mono(meth)acrylate, polyethyleneglycol (meth)acrylate, benzyl (meth)acrylate, 2,3-epoxycyclohexylmethyl (meth)acrylate, hydroxypropyl (meth)acrylate, methylproplyglycol (meth) acrylate, 3,4-epoxycyclohexylmethyl (meth)acrylate, 1,6 hexanediol di(meth)acrylate, 1,4 butanediol di(meth)acrylate and for copolymer, and combinations thereof.

Exemplary of (meth)acrylic polymers present in the acrylic polymer dispersion may also include polymers comprising polymerized (meth)acrylic monomers copolymerized with vinyl esters of vinyl halides such as vinyl chloride, an alkanoic acid with 1 C- to 12 C-atoms with non-limiting examples including vinyl acetate, vinyl propionate, vinyl valerate, vinyl 2-ethylhexanoate, vinyl laurate, vinyl versatates, and mixtures thereof. Vinyl versatates may include vinyl esters of alpha-branched monocarboxylic acids, for example VeoVa 9® or VeoVa 10® (tradenames of Momentive), which have 9 C- and 10 C-atoms, respectively, in the carboxylic acid moiety. A preferred vinyl ester monomer can be vinyl acetate. The vinyl ester monomer (a) may be copolymerized in general in an amount of from 0 percent by weight (or weight-percent [wt %]) to 20 wt % in one embodiment, and from 0 wt % to 10 wt % in another embodiment, based on the total weight of the monomers.

The anionically stabilized acrylic polymer dispersion useful in the present invention can have a concentration of polymerized acid monomer units. Exemplary acid monomer units of (meth)acrylic polymers present in the acrylic polymer dispersion may include; acrylic acid, methacrylic acid, itaconic acid, phosphoric acid, 2-hydroxyethyl methacrylate ester, and mixtures thereof. For example, in one general embodiment, the anionically stabilized acrylic polymer dispersion useful in the present invention can have a concentration of polymerized acid monomer units in the range of from 0.1 wt % or more to 5.0 wt % or less of the polymerized acid monomer, based on the total weight of all monomers in the polymer; and from 0.5 wt % to 3.0 wt % or less of the polymerized acid monomers in another embodiment. A dispersion containing <0.1 wt % acid monomer cannot be sufficiently stabilized; and a dispersion containing >5.0 wt % acid monomer will have undesirable water sensitivity and require an excessive concentration of polyaminosiloxane copolymer containing steric stabilizing groups (i.e., the setting accelerant) to be cost effective.

The anionically stabilized acrylic polymer dispersion useful in the present invention generally can also have an average particle size of form 65 nanometer (nm) or more to 500 nm or less as determined by 90-degree light scattering using a Malvern Zetasizer Nano ZS90 in one embodiment; and form 100 nm or more to 350 nm or less in another embodiment. A polymer dispersion having an average particle size outside the above ranges may not work to stabilize the dispersion because particles larger than 500 nm are difficult to adequately stabilize and particles smaller than 65 nm are difficult to produce at polymer solids which are practical for applications. The anionically stabilized acrylic polymer dispersion can consist of bimodal, trimodal and multimodal particle sizes.

In addition, the anionically stabilized acrylic polymer dispersion useful in the present invention generally can have an average glass transition temperature of from −55 degrees Celsius (° C.) or more to 35° C. or less as determined according to ASTM E-1356-08 2014 in one embodiment, and from −40° C. to 20° C. in another embodiment. In the above ranges, a polymer dispersion composition can be formulated to form a composition that can undergo film formation to transform the composition into a continuous material after application.

Furthermore, the anionically stabilized acrylic polymer dispersion useful in the present invention generally can have a concentration of the siloxane copolymer of from 0.1 wt % or more to <5.0 wt % in one embodiment, from 0.3 wt % to 2.5 wt % in another embodiment, and from 0.5 wt % to 1.5 wt % in still another embodiment, based on total weight of polymers in the composition. At a concentration of the siloxane copolymer of >5.0 wt %, there is no significant further advantage of using more siloxane copolymer to provide a useful, stable and cost-effective silane. Below a concentration of the siloxane copolymer of <0.1 wt %, an accelerated setting may not be detectable.

In general, the amount of the anionically stabilized acrylic polymer used in the composition can be in the range of from 3 wt % to 65 wt % in one embodiment; from 5 wt % to 60 wt % in another embodiment; and from 7 wt % to 55 wt % in still another embodiment, based on the total weight of the components in the composition. The preferred amount of polymer used in the formulation may also depend on the number and type of other optional ingredients used in the formulation.

The composition of the present invention contains at least one polyaminosiloxane copolymer containing steric stabilizing groups as component (b) which is useful as a setting accelerant. The polyaminosiloxane copolymer containing steric stabilizing groups may include for example copolymers comprising polymerized monomers selected from a group consisting of mixtures of amino silane monomers. Exemplary of amino silane monomers present in the mixture may include n-methylaminopropyl-trimethoxysilane, aminoethylaminopropylmethyldimethoxysilane, aminoethylaminopropyltrimethoxysilane, aminopropylmethyldimethoxysilane, aminopropyltrimethoxysilane, aminoethylaminoethylaminopropyl-trimethoxysilane, N-methylaminopropyltrimethoxysilane, aminopropylmethyldimethoxysilane, aminopropyltriethoxysilane, 4-aminobutyltriethoxysilane, and mixtures thereof. Exemplary of commercial embodiments of some of the above compounds, and mixtures thereof, that may be used in the present invention may include one or more of the amino silane monomers described in Table I as follows:

TABLE I

| Amino Silane Monomer | Examples of Commercial Materials | Supplier |
|---|---|---|
| N-methylaminopropyltrimethoxysilane | — | — |
| Aminoethylaminopropylmethyldimethoxy-silane | Dow Corning ® 1-6436 | Dow Corning |
| | KBM-602 | Shin-Etsu |
| | Silquest ® A-2120 | Momentive |
| | Dyanasylan ® 1411 | Evonik |
| | Geniosil ® GF 95 | Wacker Chemie AG |
| Aminoethylaminopropyltrimethoxysilane | Dow Corning ® Z-6020 | Dow Corning |
| | Xiameter ® OFS-6020 | Dow Corning |
| | KBM-603 | Shin-Etsu |
| | Silquest ® A-1120 | Momentive |
| Aminoethylaminopropyltriethoxysilane | Dow Corning ® Z-6021 | Dow Corning |
| | KBE-603 | Shin-Etsu |
| Aminopropylmethyldimethoxysilane | — | — |
| Aminopropyltrimethoxysilane | Dow Corning ® Z-6610 | Dow Corning |
| | KBM-903 | Shin-Etsu |
| | Silquest ® A-1110 | Momentive Performance Materials |
| Aminoethylaminoethylaminopropyl-trimethoxysilane (or Trimethoxysilylpropyldiethylenetriamine) | Dow Corning ® AY43-009 | Dow Corning |
| | Silquest ® A-1130 | Momentive Performance Materials |
| N-methylaminopropyltriethoxysilane | — | — |
| Aminopropylmethyldimethoxysilane | — | — |
| Aminopropylmethyldiethoxysilane | Dow Corning ® Z-6015 | Dow Corning |
| Phenylaminopropyltrimethoxysilane | Dow Corning ® SZ-6083 | Dow Corning |
| | KBM-573 | Shin-Etsu |
| | Silquest ® Y-9669 | Momentive Performance Materials |
| Aminopropyltriethoxysilane | Xiameter ® OFS-6611 | Dow Corning |
| | KBE-903 | Shin-Etsu |
| | Silquest ® A-1100 | Momentive Performance Materials |
| Bis(trimethoxysilylpropyl)amine | Silquest ® Y-9627, | Momentive Performance Materials |
| | Dyanasylan ® 1124 | Evonik |
| 4-Aminobutyltriethoxysilane | — | — |
| Aminoethylaminoisobutylmethyldimethoxysilane | Xiameter ® 8038 | Dow Corning |
| Ethylaminoisobutyltrimethoxysilane | Silquest ® A-Link 15 | Momentive Performance Materials |
| Polymeric aminoalkylsilicone | Dow Corning ® 2-8795 | Dow Corning |

In one preferred embodiment, the composition of the present invention comprises, consists essentially of, or consists of: an anionic stabilized dispersion of acrylic polymers containing a polyaminosiloxane copolymer containing steric stabilizing groups such as an aqueous amino silane polyalkyleneoxide silane copolymer; and the polyaminosiloxane copolymer containing steric stabilizing groups can be the product of the hydrolysis-condensation polymerization of: (i) an amino functional silane; (ii) a polyalkylene glycol silane; (iii) optionally an alkyl (or phenyl) silane; or mixtures thereof. For example, in one general embodiment, the polyaminosiloxane copolymer useful in the present invention can include the compounds of the following Structure (I):

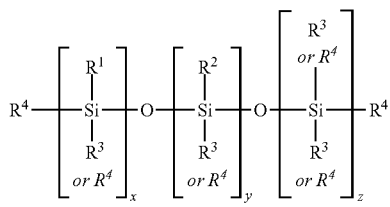

Structure (I)

$R^1$=alkyl or phenyl amino functionality
$R^2$=poly (alkylene oxide) functionality
$R^3$=alkyl (or phenyl) functionality
$R^4$=hydroxy (—OH), methoxy (—OMe) or ethoxy (—OEt)

In Structure (I) above, $R^1$ can be, for example, aminopropyl, aminomethyl, aminoethyl, aminoisobutyl, aminoethylaminopropyl, ethylaminoisobutyl, methylaminopropyl, diethylene diamine propyl, phenylaminopropyl, aminobutyl, aminoethylaminoisobutyl; $R^2$ can be, for example, methoxy poly(ethylene oxide) propyl, hydroxy poly(ethylene oxide) propyl, or acetoxy poly(ethylene oxide) propyl; $R^3$ can be, for example, methyl or phenyl; and $R^4$ can be, for example, hydroxy, methoxy, or ethoxy.

Generally, the amino functional silane present in the hydrolysis-condensation polymerization can be from 97 mole-percent (mol %) to 66 mol % in one embodiment, and from 93 mol % to 70 mol % in another embodiment.

In one embodiment, the amino group ($R^1$) of the amino functional silane can be a either a primary amine (—$NH_2$); or a secondary amine (—NH—R), where R can be a C1 to C8 alkyl amine such as a methyl amine, ethyl amine, or propyl amine, ethylene diamine (—NH—$CH_2$—$CH_2$—$NH_2$) or diethylene triamine, and mixtures thereof; or a C3 alkyl aryl amine such as phenyl amine (—NH-Phenyl), and mixtures thereof.

The primary amino units of the amino functionality can include for example, aminopropyl, aminomethyl, aminoethyl or amino isobutyl and mixtures thereof. The secondary amino units of the amino functionality can include for example, aminoethylaminopropyl, methylaminopropyl, ethylaminoisobutyl, triaminodiethylenepropyl, phenylaminopropyl, methylaminomethyl, ethylaminomethy, phenylaminomethyl, aminoethylaminoisobutyl and mixtures thereof.

The equivalent weight of the silane monomer of the composition can be for example, <250 grams per mole (g/mol) in one embodiment, from 80 g/mol to 240 g/mol in another embodiment, and from 100 g/mol to 230 g/mol in still another embodiment.

Generally, the polyalkylene glycol silane present in the hydrolysis-condensation polymerization can be from 3 mol % to 15 mol % in one embodiment, and from 6 mol % to 12 mol % in another embodiment.

The average molecular weight of the polyalkylene glycol silane of the composition can be for example, from 200 Daltons (Da) to 2,000 Da in one embodiment, from 250 Da to 1,750 Da in another embodiment, and from 300 Da to 1,500 Da in still another embodiment.

The alkylene of the polyalkylene oxide silane may include units of ethylene oxide, propylene oxide, and mixtures thereof. The polyalkylene of the polyalkylene oxide silane can be uncapped with OH or capped with an alcohol such as methanol, ethanol, propanol, butanol, and mixtures thereof; or capped with a C1 to C4 alkyl group such as methyl, ethyl, propyl, butyl, and mixtures thereof; or capped with an acetoxy or acetate end group.

Generally, the composition of the present invention can optionally include a C1 to C8 alkyl silane, phenyl silane, C1 to C8 alkyl phenyl silane, or mixtures thereof. For example, the above compounds may include dimethoxydimethylsilane, diethoxydimethylsilane, trimethoxymethylsilane, triethoxymethylsilane, dimethoxy(methyl)phenylsilane, diethoxy(methyl)phenylsilane, trimethoxyphenylsilane, triethoxyphenylsilane, octyltrimethoxysilane, and mixtures thereof. In one embodiment, the amount of the above compounds, when used, can be from 0 mol % to 20 mol %, from 0.01 mol % to 15 mol % in another embodiment, and from 0.1 mol % to 10 mol % in still another embodiment.

In one general embodiment, the polyaminosiloxane copolymer containing steric stabilizing groups component (b) can be characterized as follows: (a) at least a portion of the silicon atoms in the polyaminosiloxane copolymer containing steric stabilizing groups have a pendant group with a primary or a secondary amine functionality; and (13) at least a portion of the silicon atoms in the polyaminosiloxane copolymer containing steric stabilizing groups have a pendant alkyl-poly(ethylene oxide) chain with a number of ethylene oxide units.

For example, at least 70 mol %, based on the moles of the total polymers in the composition, of the silicon atoms in the polyaminosiloxane copolymer containing steric stabilizing groups can have a pendant group with a primary or a secondary amine functionality in one embodiment, from 70 mol % to 95 mol % in another embodiment and from 85 mol % to 90 mol % in still another embodiment.

For example, from 5 mol % to 20 mol %, based on the weight of the total polymers in the composition, of the silicon atoms in the polyaminosiloxane copolymer containing steric stabilizing groups can have a pendant alkyl-poly (ethylene oxide) chain in one embodiment, from 5 mol % to 15 mol % in another embodiment, and from 5 mol % to 10 mol % in still another embodiment. The pendant alkyl-poly (ethylene oxide) chain may have from 5 ethylene oxide units to 30 ethylene oxide units in one embodiment, from 6 ethylene oxide units to 20 ethylene oxide units in another embodiment, and from 7 ethylene oxide units to 15 ethylene oxide units in still another embodiment.

In one preferred embodiment, the polyaminosiloxane copolymer containing steric stabilizing groups can be characterized by: (a) at least 70 mol % of the silicon atoms in the copolymer have a pendant group with both a secondary and a primary amine functionality; and 03) 5 mol % to 20 mol % of the silicon atoms in the copolymer have a pendant alkyl-poly(ethylene oxide) chain with 5 ethylene oxide units to 20 ethylene oxide units.

The primary pendant group(s) on the silicon atoms of the polyaminosiloxane copolymer containing steric stabilizing groups can include for example 2-aminoethyl, 3-aminopropyl, 4-aminodimethylbutyl, 3-(2-aminoethylamino)propyl, propyl(diethylenetriamine), and mixtures thereof.

The secondary pendant group(s) on the silicon atoms of the polyaminosiloxane copolymer containing steric stabilizing groups can include for example 3-(2-aminoethylamino) propyl, propyl(diethylenetriamine), N-ethyl-gamma-aminoisobutyl, methyl, ethyl, propyl, phenyl, and mixtures thereof.

The pendant alkyl-poly(ethoxide) chain group(s) on the silicon atoms of the polyaminosiloxane copolymer containing steric stabilizing groups can include for example hydroxy, methyl, or alkyl capped polyethylene oxide, polypropylene oxide, polybutylene oxide and mixtures thereof.

The pendant alkyl-poly(ethylene oxide) chain group(s) on the silicon atoms of the polyaminosiloxane copolymer containing steric stabilizing groups can include a chain with from 5 ethylene oxide units to 20 ethylene oxide units in one embodiment, from 5 ethylene oxide units to 35 ethylene oxide units in another embodiment, and from 4 ethylene oxide units to 100 ethylene oxide units in still another embodiment.

One skilled in the art will recognize that the concentration of the ethylene oxide units will influence the desired concentration of the pendant alkyl-poly(ethylene oxide) chain group(s) on the silicon atoms of the polyaminosiloxane copolymer to afford a balance of properties relating dispersion stability and film setting.

The polyaminosiloxane copolymer containing steric stabilizing groups can be present in the composition in an amount generally in the range of from 0.01 wt % to 5 wt % in one embodiment; from 0.025 wt % to 4 wt % in another embodiment; and from 0.08 wt % to 3 wt % in still another embodiment.

Optionally, the composition of the present invention may be formulated with a wide variety of one or more additives to enable performance of specific functions while maintaining the excellent benefits/properties of the present invention composition. For example, optional components useful in the aqueous coating composition of the present invention may include pigments, fillers, dispersants, coalescents, pH modifying agents, plasticizers, defoamers, surfactants, thickeners, biocides, co-solvents, and combinations thereof. The choice of additives in the composition will be influenced by a number of factors, including the nature of the acrylic polymer dispersion and the intended use of the coating composition.

In one embodiment, the formulation may include an inorganic filler, sometimes referred to as pigment or extender. The inorganic filler is typically in particulate form dispersed in the formulation. Suitable fillers include, for example, any one or combination of more than one selected from a group consisting of metal oxides (such as titanium oxide, zinc oxide, iron oxide and the like), calcium carbonate, nepheline syenite, aluminosilicates, feldspar, diatomaceous earth, calcined diatomaceous earth, talc, sand, silica, aluminum oxide, clay, kaolin, mica, pyrophyllite, perlite, barite, sodium-potassium alumina silicates and calcium metal silicate. In a preferred embodiment, the inorganic filler can be one or any combination of more than one selected from a group consisting of metal oxides, calcium carbonate and sodium-potassium alumina silicates.

The concentration of inorganic filler may be, for example, 0 volume-percent (vol %) or >0 vol % such as greater than or equal to (>) 0.1 vol % in one general embodiment, 10 vol % or more in another embodiment, 30 vol % or more in still another embodiment, 50 vol % or more in yet another embodiment, and 75 vol % or more in even still another embodiment, where vol % is relative to the total volume of the formulation.

In another embodiment, the formulation optionally may comprise one, or more than one, rheology modifier. Rheology modifiers are useful to adjust the viscosity of the formulation. Exemplary of suitable thickening agents useful in the present invention may include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and mixtures thereof. Other rheology modifiers may include non-ionic volume exclusion thickeners which include any one, or any combination of more than one, thickeners selected from a group consisting of hydroxyethyl cellulose, hydroxyethyl methyl cellulose, polyvinyl alcohol, polyvinylpyrrolidone, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers.

The rheology modifier can be present in the formulation at a concentration of, for example, embodiments including zero (0) wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, and 0.9 wt % or more; while at the same time, the rheology modifier can be present in the formulation at a concentration of 1.0 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less and 0.1 wt % or less, relative to the total formulation weight. In one preferred embodiment, the wt % of the rheology modifier can be determined from the formulation composition from the concentration of the components added to a formulation.

In still another embodiment, the composition may optionally contain one or more volatile bases and/or one or more non-volatile bases. Exemplary volatile bases include, but are not limited to, ammonia; lower alkylamines such as dimethylamine and diethylamine; ethanolamine; morpholine; aminopropanol; 2-amino-2-methyl-1-propanol; 2-dimethylaminoethanol; and combinations thereof. In other preferred embodiments, the volatile base can be ammonia. Exemplary non-volatile bases include, but are not limited to, alkali metal hydroxides such as sodium hydroxide.

Generally, one or more volatile bases and/or non-volatile bases can be incorporated in the composition in an effective amount to maintain the pH of the aqueous evaporable carrier of the composition in the range of from 7.2 to 10.5 or in the range of from 7.5 to 10.5. In some embodiments, one or more volatile bases and/or non-volatile bases can be incorporated in the composition at concentrations of between 0 wt % and 5.0 wt %. In certain embodiments, one or more volatile bases and/or non-volatile bases can be incorporated in the composition at concentrations of between 0.1 wt % and 2.5 wt %.

In one preferred embodiment, the desired pH of the aqueous evaporable carrier of the formulation of the present invention can be obtained by adding a volatile base such as ammonia; a nonvolatile base such as sodium hydroxide; or a mixture of volatile bases and non-volatile bases.

In yet another embodiment, suitable dispersants can be added to the composition including for example, polyacid dispersants and hydrophobic copolymer dispersants. Polyacid dispersants can typically include, for example, polycarboxylic acids, such as polyacrylic acid or polymethacrylic acid, which are partially or completely in the form of their ammonium; alkali metal; alkaline earth metal; ammonium; or lower alkyl quaternary ammonium salts; and combinations thereof. Hydrophobic copolymer dispersants can include, for example, copolymers of acrylic acid, methacrylic acid, or maleic acid with hydrophobic monomers.

In even still another embodiment, suitable coalescents, which aid in film formation during drying, can be added to the composition including for example, ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

In yet another embodiment, other suitable additives that can optionally be incorporated into the composition can include, for example, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleansability additives, crosslinking agents, flatting agents, flocculants, humectants, insecticides, lubricants, odorants, oils, waxes and slip aids, soil repellants, stain resisting agents, and combinations thereof.

The optional compounds, when used in the composition of the present invention, can be present in an amount generally in the range of from 0 wt % to 0.2 wt % in one embodiment; from 0 wt % to 0.5 wt % in another embodiment; and from 0 wt % to 1.5 wt % in still another embodiment.

In yet another embodiment, the composition may optionally include combinations of other aqueous polymer dispersion including polyurethane dispersions, mechanical dispersions of polyolefins, epoxy resin dispersions, polysiloxane dispersions, and combinations thereof.

The optional compounds, when used in the composition of the present invention, can be present in an amount generally in the range of from 0 wt % to 1 wt % in one embodiment; from 0 wt % to 2.5 wt % in another embodiment; and from 0 wt % to 5.0 wt % in still another embodiment.

In one broad embodiment, the process for making the composition or formulation of the present invention includes mixing, admixing or blending (a) at least one an anionic stabilized dispersion of acrylic polymers; and (b) at least one polyaminosiloxane copolymer containing steric stabilizing groups. One or more additional optional components may be added to the formulation as desired. For example, the components (a) and (b) can be mixed together in the desired concentrations discussed above and at a temperature of from about 5° C. to about 50° C. in one embodiment; and from about 15° C. to about 25° C. in another embodiment. The order of mixing of the components is not critical and two or more components can be mixed together followed by addition of the remaining components. The formulation components may be mixed together by any known mixing process and equipment.

In another embodiment the process for making the composition or formulation of the present invention includes mixing, admixing or blending (a) at least one an anionic stabilized dispersion of acrylic polymers with the additional optional components such as pigments, extenders, dispersants, rheology modifiers may be premixed in a formulation to which the (b) at least one polyaminosiloxane copolymer containing steric stabilizing groups may be added to the formulation components and may be mixed together by any known mixing process and equipment.

The composition of the present invention produced by the process of the present invention has several advantageous properties and benefits compared to known formulations. For example, some of the properties/benefits exhibited by the present invention composition can include, for example, increased stability, rapid setting, no flocculation, low pH, low requirement of a base, low odor, and high solids contents.

For example, the viscosity of the composition of the present invention, can be generally in the range of from 1 millipascals-seconds (mPa-s) to 5,000 mPa-s in one embodiment; from 5 mPa-s to 4,000 mPa-s in another embodiment; and from 50 mPa-s to 3,000 mPa-s in still another embodiment. The viscosity of the composition can be measured by any of the conventional viscosity measurement methods known in the art.

In general, "product stability" is a requirement for the successful application of the product to a substrate. A product not having stability may become too thick to apply by any of the various conventional application methods which may be utilized in a particular application. Furthermore, a product not having stability may contain agglomerations that may lead to visual and/or mechanical defects within the final applied product. Those skilled in the art will recognize that the stability required for a rapid setting composition may vary greatly depending upon the formulation type, intended use, as well as application method. For example, product application with a sprayer may require the formulation to maintain viscosity and flow for pumpability; and be free of grit or agglomeration which could clog sprayer nozzles. Spray applications may be applied rapidly and can be designed with minimal residence time between the setting accelerant and coating. The stability of a composition can be measured by (1) combining the setting accelerant and product via a mixing method, (2) after mixing, allowing time for composition equilibration and defoaming, and (3) then testing the product for grit and flocculation. A conventional grind gauge instrument may be used to verify the stability of the combined, equilibrated mixture as such gages are typically used to indicate the fineness of grind or to detect the presence of coarse particles or agglomerates. Flocculation, coagulation, or grit are usually formed immediately upon mixing and a 5-minutes equilibration time is sufficient before testing the fineness of the mixture using a grind gauge such as an NPIRI Grindometer and using a testing method, for example, as described in ASTM Test D-1316. A stable mixture should not increase by >5 micrometers (μm) in size relative to the formulation without aminosiloxane.

The stability of the composition of the present invention, can be generally in the range of from an NPRIR fineness difference from 0 to 2 in one embodiment; from 0 to 1 in another embodiment; and 0 (no change in fineness) in still another embodiment.

Conventional, non-rapid setting, waterborne products which utilize anionic polymer dispersions, such as acrylic emulsions, coalesce through particle-particle and/or particle-filler interactions to build the mechanical properties of the final product. Properties build happens after sufficient water evaporation has occurred to concentrate and destabilize the dispersion collapsing the polymer particles.

"Rapid setting", with reference to a product, is the ability of the product to achieve resistance to mechanical defects and/or resistance to water washout sooner than would otherwise occur if the product was to set by water evaporation. The ability to reduce this setting time is valuable to formulators and applicators. For example, faster setting allows for the use of water-based products in colder and/or more humid conditions which enables application in seasons with less favorable weather, or application if rain is expected. Rapid setting may also reduce the time to achieve resistance to mechanical defects. Such performance is valuable to formulators and applicators because such rapid setting products: (1) can more quickly develop resistance to marring damage from dirt or debris which could be encountered, for example, during exterior application of the product; (2) may provide earlier blocking or stack resistance; and/or
(3) may be recoated with additional top coats sooner.

Those skilled in the art will recognize that setting time for products can vary greatly, and many factors such as temperature, humidity, formulation pigment volume concentration, product solids, product thickness, or the substrate conditions will have an impact on the set time of products. For example, it is desirous that compositions used for traffic or pavement markings have shorter set times to enable minimal disruption to traffic. Other products may need a greater degree of workability after the initial applications. For example, exterior finish systems desire about 1 hour to allow for troweling or refinishing before setting. Thus, rapid setting is a comparative of time between comparable formulations with and without the setting accelerant; that is, the time required for a product to set by a particular method and achieve resistance to mechanical defects and/or resistance to water washout compared to the time required for a product to set by water evaporation and achieve similar resistance to mechanical defects and/or resistance to water washout.

Those skilled in the art will also recognize that rapid setting may be measured by a comparative pass-fail water washout tests such as the tests describe in U.S. Pat. No. 7,897,669B2 or U.S. Pat. No. 4,571,415A. Alternatively, more quantitative instruments such as a straight line or circular mechanical drying-time recording device may be employed to measure set time. The rapid setting of the composition of the present invention can be measured using such a recording device by the method described in ASTM D-5895-13. The test determines the various stages of drying by drawing a Teflon ball stylus through a composition while that composition is drying. The test is complete at the 'Dry-Through Time' when the stylus rises out of a coating (formed by the composition) with no tearing or patterning to the surface of the coating. When measuring set time with a circular mechanical drying-time recording device, the set time is denoted as "Stage D".

Generally, the "rapid setting" property of the composition of the present invention, can be defined herein as a reduction of the relative "Dry-Through Time" of the composition on a relative percentage basis. Based on a 100% reduction of the relative Dry-Through Time being instant drying, the reduction of the relative Dry-Through Time, in one embodiment, can be greater than 25%; greater than 35% in another embodiment; and greater than 40% in still another embodiment. In another embodiment, the reduction of the relative Dry-Through Time can be less than 90%. Other embodiments of the reduction of the relative Dry-Through Time can include ranges of, for example, from 25% to 90%, from 35% to 90%, and from 40% to 90%.

The pH of the composition of the present invention, can be generally in the range of from 7 to 10.5 in one embodiment; from 7.2 to 10 in another embodiment, and from 8 to 9.5 in still another embodiment. The pH of the composition can be measured by the method described in ASTM E70. In general, a base should not be required to adjust the pH of the composition and if a base is used the amount of the base used should be minimized. If a base is used to adjust the pH of the composition, the amount of base used can be generally in sufficient amount to provide a composition pH in the range of from 7 to 10.5 in one embodiment; from 7.2 to 10 in another embodiment, and from 8 to 9.5 in still another embodiment. If a base is used to adjust the pH of the composition, the amount of base can be for example from 0 wt % to 2 wt % in one embodiment; from 0.01 wt % to 1.0 wt % in another embodiment, and from 0.01 wt % to 0.5 wt % in still another embodiment.

The solids content of the formulation of the present invention can depend on the function of the desired application in which the formulation of the present invention will be used. For example, for a clear varnish coat end use, the varnish may include very low solids and may contain few, if any, extenders. For other applications, such as for a sealant or an exterior finish which typically contain extenders and fillers, a high solids content may be used to maximize build upon application as well as minimize dry time and shrinking upon drying. As one illustration of the present invention, and not to be limited thereby, the solids content of the composition of the present invention can be generally in the range of from 20% to 80% in one embodiment; from 30% to 75% in another embodiment; and from 35% to 70% in still another embodiment. Generally, solids content is defined as the weight percent of volatile content of the composition. Solids content can be measured, for example, by various tests such as the test described in ASTM D2369-10 (2015).

In another embodiment, the odor of the composition of the present invention is desirably minimized and kept at as low a level as possible. It is known by those skilled in the art that odor is directly correlated to the volatile base concentration present in a formulation and the pH of the formulation. The higher the pH of a formulation is, the stronger odor a formulation will have compared to a formulation having a lower pH with an equivalent volatile base concentration.

The present invention can be contrasted versus amino silanes or aminosiloxanes known in the art that are used as setting accelerants and that do not have a polyether glycol group to enhance stability and increase formulation latitude. By "increased formulation latitude" herein means a formulation containing the amino siloxane composition of the present invention that has less constraints to achieve a stable, rapid setting mixture such that the mixture maintains its capability to be applied to a substrate. For example, the pH range of use of the formulation of the present invention is less than other known amino silanes/siloxane and the viscosity of the formulation of the present invention does not need to be high (e.g., >15 MPa [15,000 cps]). For example, it is known in the art to add an amino functional silane or siloxane such as aminopropyl trimethoxy silane (e.g., Silquest™ A-1110 available from Momentive) or a condensation product of such silane to a formulation such that pH triggered flocculation is induced upon application. The known amino silane materials are also used to provide adhesion as part of a polyamine admixture for accelerating setting; and to achieve accelerated setting. Typically, the known amino silane materials are used in a formulation at a required concentration of from 0.5 wt % to 2.0 wt % based on the weight of the polymer solids of the formulation. However, the addition of a sufficient concentration of amino silane to achieve setting also requires a significant excess of a pH neutralizer to prevent the formulation from coagulating.

It has also been discovered, for example, that when a hydrolysis-condensation product of aminopropyl trimethoxy silane is used in a formulation, ammonia (or an ammonia alkali non-volatile base admixture) must be added to the formulation to provide a pH of ≥11.0 in order to prevent the formulation from coagulating such that the formulation has a consistency ranging from grit to gelation. The amount of base solution that must be added to the formulation to achieve a pH of ≥11.0 can exceed 10% of the total formulation weight. This amount of base in the formulation undesirably reduces the solids content of the formulation. Also, if a volatile base is used in the formulation, the volatile base can impart a very strong contribution to the odor of the formulation.

Using the composition of the present invention, it has surprisingly been found that aminosiloxane compositions, which exhibit steric stabilization imparted by a polyether glycol functionality, reduces the pH required to achieve a stabile mix with an anionic dispersion or products formulated with an anionic dispersion. Also, it has been unexpectedly found that the polyether glycol functionality of the composition including aminosiloxane setting accelerants advantageously provides rapid setting with a more desirable formulation pH, odor, and solids content. For example, a composition having a higher solids content advantageously does not need to be diluted to an unacceptable level. The composition also advantageously has a lower amine/ammonia odor. And, the composition with a lower pH is advantageous because the composition can be less caustic. In addition, including more polyether glycol functional silane in the aminosiloxane composition facilitates a stable addition of the composition to coatings at a pH of as low as 7.

In one preferred embodiment, for example, aminosiloxane copolymers that include about 3 mol % of ethoxylated silane, 2-[methoxy(polyethyleneoxy)9-12propyl] trimethoxysilane, stabilizes the composition against grit and gelation when the coating composition of the acrylic anionically stabilized dispersion or formulation is at a pH of approximately 9.5 (versus 11.0 with the aminosilane or aminosiloxane without ethoxylated silane in the copolymer; this is the difference between adding 1% ammonia or 10% ammonia to a coating composition). In another embodiment, a composition including about 7 mol % of the ethoxylated silane in the aminosiloxane provides a formulation with a pH of about 9.0; and a composition including about 10 mol % of the ethoxylated silane provides a formulation with a pH of about 7 in still another embodiment. Aminosiloxane copolymers that contain 10 mol % ethoxylated silane can achieve rapid setting in dispersions or formulations that are free of ammonia or other volatile base. Thus, the formulations of the present invention achieve setting without a pH triggered base volatilization. On the other hand, a composition including about 18 mol % of the ethoxylated silane provides the composition with a sufficient stability performance but any rapid setting effect is negated (i.e., setting time is equal to a control).

Without being bound by any particular theory, it is believed that the sterically stabilized aminosiloxane additives exchange electrostatic anionic particle stability for weaker steric stabilization that collapses sooner than would otherwise occur as the particles pack more densely in a drying process.

The composition of the present invention can be used in a wide variety of applications including, for example, dispersions, coatings, sealants, and masonry finishes. For example, the coatings can be exterior coatings such as roof coatings, water-based traffic markings, exterior finishing systems, liquid applied flashing, and sealants.

In a preferred embodiment, the composition of the present invention can be used, for example, as a coating composition to form a coating on a substrate. The substrate useful in the present invention can include for example metals such as aluminum, copper, steel, zinc, tin, and mixtures thereof. The substrate can also include construction and masonry materials for example wood, brick, concrete, gypsum board, slate, marble, granite, cast stone, glass block, and mixtures thereof. The substrate can also include roof materials such as asphalt, modified bitumen, silicones, ethylene propylene diene monomer rubber, thermoplastic polyolefin, and combinations thereof. The substrate can also include roadway and walkway materials such as asphalt, concrete, gravel, cobblestone, pavers such as brick and cast block, grass, and combinations thereof. The substrate can also include articles coated with organic or silicone coatings.

The coating composition can be produced by admixing the components in a first step. The mixture is homogenized by mixing by any of the known methods to one skilled in the art and may be done at a temperature and product consistency appropriate for the product applications. Then, the coating can be applied by as a second step utilizing methods such as spraying, brushing, rolling, troweling, dipping, and squeegeeing. After the application second step, the coating can be dried; and the drying step can often occur at ambient conditions ranging, for example, from 5° C. to 45° C. Alternatively, the drying step may be performed in a factory applied setting where the article can be baked at elevated temperatures of from 30° C. to 95° C.

The coating thickness used may depend on the function of the coating composition in the various applications. For example, in one embodiment, a coating having a thickness of from 25 micrometers (μm) to 13 millimeters (mm) can be produced for coating applications. In another embodiment, a masonry finish having a thickness of, for example, from 50 μm to 26 mm can be produced for masonry applications. In still another embodiment, a sealant having a thickness of, for example, from 0.5 mm to 1 centimeter (cm) can be produced for sealant applications.

The coating manufactured by the process described above has several beneficial properties including, for example, the following benefits: a more rapid resistance to water washout, an earlier time to resistance against marring, an earlier time to recoat, a longer application window with respect to poor drying conditions such as at a low temperature (e.g., 5° C.) or at high relative humidity (e.g., 85%).

EXAMPLES

The following examples are presented to further illustrate the present invention in detail but are not to be construed as limiting the scope of the claims. Unless otherwise stated all parts and percentages are by weight.

Various materials used in the examples are explained in Table II as follows:

TABLE II

| Raw Materials | | |
|---|---|---|
| Component | Description | Supplier |
| Bruggolite ™ FF6 M | Reducing agent: a sodium salt of an organic sulfinic acid derivative. | Brugemann, KG |
| DEE FO ™ 1015 | A defoamer of petroleum distillates, solvent dewaxed heavy paraffinic CAS#64742-65-0 >50%. | Munzing Group |
| Disponil ™ FES-99312 | An anionic surfactant, 12 EO fatty alcohol ether sulfate. | BASF Corporation |
| Dow Corning IE-6683 Emulsion | A 40% active non-ionic silane-siloxane based emulsion. | Dow Corning |
| Michem ® Emulsion 62330 | A 30% solids anionic paraffin/polyethylene co-emulsion. | Michelman, Inc. |
| SNOWHITE ™ 12 | A 12-micron particle size calcium carbonate. | Omya Group |
| TAMOL ™ 851 dispersant | A polyacid pigment dispersant that is 30% solids in water and is free of ammonia and formaldehyde. | Rohm and Haas Company |
| Ti-Pure ™ R-960; | Rutile titanium dioxide pigment of median particle size, μm 0.50. | The Chemours Company, TT, LLC |
| UCAR ™ Filmer IBT; | 2,2,4-Trimethyl-1,3-pentanediol monoisobutyrate. | Union Carbide |
| WALOCEL ™ MT 30000 PV; | A high molecular weight hydroxyethyl methyl cellulose. | The Dow Chemical Company |
| Witcobond ™ 418-49 | A 60% solid, aqueous, aliphatic type, polyester polyurethane dispersion with anionic stabilization. | Chemtura Corporation |

Test Methods

Setting Using Dry Time Recorder Measurement

The setting of a dispersion or coating sample is tested according to ASTM D-5895-13 (2013) and the test is conducted using a Gardner Instruments DG 9300 dry time recorder. Generally, the steps of the procedure for testing the setting of the dispersion or coating are as follows: A test panel of Leneta scrub test chart P121-10N is provided. A film of the sample is applied to the test panel using a 15.2 centimeters BYK 20 MIL wet film applicator. The above dry time recorder is then placed onto the test panel such that the radius of the stylus used in the recorder is center within the film of the sample to be tested; and thereafter, the test is begun. The set time measured of the film sample is recorded as the time interval from when the stylus rises out of the film sample and rides on the surface of the film sample and does not tear or pattern the surface of the sample.

Agglomerations Measurement

Instability (i.e., production of flocculation) due to addition of the aminosiloxane is tested according to ASTM D1316-06

(2011) by measuring the fineness of the dispersion or coating using a G-2 NPIRI grindometer. "NPIRI" stand for National Printing Inks Research Institute. A lower score of the NPIRI value indicates a higher degree of fineness. In comparative examples, an increase in the NPIRI value substantively indicates the formation of a gel (i.e., the composition is unstable) resulting from undesired flocculation.

The instability of the dispersion or coating sample is tested using the following general procedure: A bubble free composition sample is placed into the deep end of a channel of the grindometer such that the level of the sample overflows the channel slightly. A scraper is then drawn across the grindometer parallel to the channel (or groove). The surface of the grindometer pattern is then immediately observed visually. The end point of the test is recorded as the location where the scratches on the film samples are >10 millimeters (mm) in length.

Instability may also be apparent without the need to test by a fineness gauge grindometer. If a sample where the addition of aminosiloxane to the composition results in visually apparent grit or larger sized agglomerations, or if the addition of aminosiloxane congeals the sample.

General Procedures for Producing Dispersions

General Procedure for Producing an Anionic Dispersion of Acrylic Polymer DA

An anionic dispersion of an ammonia-free pH 7 anionically stabilized acrylic polymer dispersion (herein designated as "Acrylic Polymer DA") is prepared by emulsion polymerization in a four-neck one-liter round bottom reaction flask equipped with a condenser, a mechanical stirrer, a thermocouple, a monomer feed line and a nitrogen inlet.

A monomer emulsion is also prepared in a second vessel separate from the reaction flask by mixing 75.0 grams (g) of deionized water and 13.0 g of a 23.0% solution of sodium dodecylbenzenesulfonate in water followed by adding 148.5 g butyl acrylate, followed by 148.5 g methyl methacrylate and 3.0 g methacrylic acid.

To the reaction flask is added 155.0 g deionized water and the flask is heated to 83° C. under a nitrogen sweep while stirring the contents in the flask. Then, the following components were added to the flask: 0.68 g of a 23.0% solution of sodium dodecylbenzenesulfonate in water; a solution containing 0.09 g sodium carbonate dissolved in 10.0 g deionized water; and a solution containing 1.5 g sodium persulfate dissolved in 10.0 g deionized water. The monomer emulsion is fed into the reaction flask at a rate of 6.5 grams per minute (g/min) and the temperature of the flask is maintained at 83° C. during the monomer emulsion feed.

After the monomer emulsion addition is completed, the reaction flask temperature is held at 83° C. for 10 min. The reaction flask is then cooled to 70° C. and 0.5 g of 0.15 wt % solution of ferrous sulfate in water is added to the flask. Chase residual monomers by addition of 0.14 g of a 70% solution of tert-butylhydroperoxide in water dissolved in 6.3 g of deionized water followed by a solution of 0.22 g reducing agent (Bruggolite™ FF6 M; Bruggolite is a trademark of Brugemann, KG) in 6.3 g of deionized water. Cool the reaction flask to 35° C. and add 0.42 g of potassium hydroxide dissolved in 8.1 g of deionized water. Cool the resulting dispersion to room temperature (approximately 22° C.) and filter the resulting cooled dispersion through a 325-mesh stainless steel screen.

The resulting dispersion contains a solids content of 51.1 wt % and particles with an average particle size of 152 nm. The dispersion has a Tg of 13° C. and a pH of 7.2. And, the dispersion contains no volatile base. The composition of the polymer particles in the dispersion is 49.5 wt % butyl acrylate, 49.5 wt % methyl methacrylate and 1.0 wt % methacrylic acid. The dispersion contains 0.51 wt % sodium dodecylbenzene sulfonate.

General Procedure for Producing an Anionic Dispersion of Acrylic Polymer DB

An ammonia-containing anionically stabilized acrylic polymer dispersion having a pH of 9 (herein designated as "Acrylic Polymer DB") is prepared according to the procedure used to prepare Acrylic Polymer DA above except that sodium persulfate is replaced with 1.5 g of ammonium persulfate, potassium hydroxide and dilution water is replaced with 2.3 g of 29% solution of ammonium hydroxide in water.

The resulting dispersion has a solids content of 51.3 wt %, an average particle size of 154 nm, a Tg of 15° C., a pH of 9.0, and contains 0.11% volatile base based on total weight of dispersion. The composition of the polymer particles in the dispersion is 49.5 wt % butyl acrylate, 49.5 wt % methyl methacrylate and 1.0 wt % methacrylic acid. The dispersion contains 0.51 wt % sodium dodecylbenzene sulfonate.

General Procedure for Producing an Anionic Dispersion of Acrylic Polymer DC:

An ammonia-containing anionically stabilized acrylic polymer dispersion having a pH of 9 and wherein the polymer contains no acid monomers (herein designated as "Acrylic Polymer DC") is prepared according to the procedure used to prepare Acrylic Polymer DB above except that all methacrylic acid monomer is replaced with 3.0 g of methyl methacrylate, the amount of sodium dodecylbenzene sulfonate in the monomer emulsion is reduced to 2.0 g, and the ammonia added to the composition is 1.1 g total.

The resulting dispersion has a solids content of 52.0 wt %, an average particle size of 175 nm, a Tg of 11° C., a pH of 9.0, and contains 0.06% volatile base based on total weight of dispersion. The composition of the polymer particles in the dispersion is 49.5 wt % butyl acrylate and 50.5 wt % methyl methacrylate. The dispersion contains 0.11 wt % sodium dodecylbenzenesulfonate.

General Procedure for Producing an Anionic Dispersion of Acrylic Polymer DD

An ammonia-containing pH 9 anionically stabilized acrylic polymer dispersion wherein, relative to Acrylic Polymer DA, the particle size is increased and the glass transition temperature is decreased (herein designated as "Acrylic Polymer DD") is prepared according to the procedure used to prepare Acrylic Polymer DB above with the following changes: no sodium dodecylbenzenesulfonate is added to the reactor; 58.0 g of acrylic polymer seed Acrylic Polymer DB is added to the reactor after the addition of ammonium persulfate, and the composition of the monomer emulsion is changed to: 75.0 g deionized water, 1.5 g of a 23.0% solution of sodium dodecylbenzenesulfonate in water, 249.0 g butyl acrylate, 46.5 g methyl methacrylate, and 4.5 g methacrylic acid. The ammonia added to Acrylic Polymer DD is increased to 2.7 g of a 29% solution of ammonium hydroxide in water.

The resulting dispersion has a solids content of 53.0 wt %, an average particle size of 332 nm, a Tg of −32° C., a pH of 9.0, and contains 0.14% volatile base based on total weight of dispersion. The composition of the polymer particles in the dispersion is 83.0 wt % butyl acrylate, 15.5 wt % methyl methacrylate and 1.5 wt % methacrylic acid. The dispersion contains 0.10 wt % sodium dodecylbenzene sulfonate.

General Procedure for Producing an Anionic Dispersion of Acrylic Polymer DE

An ammonia-containing pH 9 anionically stabilized acrylic polymer dispersion containing fatty alcohol ether sulfate surfactant (herein designated as "Acrylic Polymer DE") is prepared according to the procedure used to prepare Acrylic Polymer DB above with the following changes: sodium dodecylbenzene sulfonate added to the reactor is replaced with 0.1 g of a 30% solution of a 12 EO fatty alcohol ether sulfate (Disponil™ FES-993; Disponil is a trademark of BASF corporation) in water, the composition of the monomer emulsion is changed to: 75.0 g deionized water, 2.1 g of a 30% solution of 12 EO fatty alcohol ether sulfate in water, 249.0 g butyl acrylate, 46.5 g methyl methacrylate, and 4.5 g methacrylic acid. The ammonia added to Acrylic Polymer DE is increased to 2.3 g of a 29% solution of ammonium hydroxide in water.

The resulting dispersion has a solids content of 52.2 wt %, an average particle size of 262 nm, a Tg of −32° C., a pH of 9.0, and contains 0.12% volatile base based on total weight of dispersion. The composition of the polymer particles in the dispersion is 83.0 wt % butyl acrylate, 15.5 wt % methyl methacrylate and 1.5 wt % methacrylic acid. The dispersion contains 0.11 wt % 12 EO fatty alcohol ether sulfate.

General Procedure for Producing an Anionic Dispersion of Acrylic Polymer DF

An ammonia-containing pH 9 anionically stabilized acrylic polymer dispersion wherein the polymer contains the alternative acid monomer phosphoric acid 2-hydroxyethyl methacrylate ester (herein designated as "Acrylic Polymer DF") is prepared according to the procedure used to prepare Acrylic Polymer DB above with the following changes: all of the methacrylic acid is replaced with 0.9 g of phosphoric acid 2-hydroxyethyl methacrylate ester and 2.1 g of methyl methacrylate. The ammonia added to Acrylic Polymer DF is decreased to 0.05 g of a 29% solution of ammonium hydroxide in water.

The resulting dispersion has a solids content of 49.8 wt %, an average particle size of 160 nm a Tg of 13° C., a pH of 9.1, and contains 0.14% volatile base based on total weight of dispersion. The composition of the polymer particles in the dispersion is 49.5 wt % butyl acrylate, 50.2 wt % methyl methacrylate and 0.3 wt % phosphoric acid 2-hydroxyethyl methacrylate ester. The dispersion contains 0.52 wt % sodium dodecylbenzenesulfonate.

General Procedure for Producing an Anionic Dispersion of Acrylic Polymer DG

An ammonia-containing pH 9 anionically stabilized acrylic polymer dispersion wherein the polymer glass transition temperature is increased (herein designated as "Acrylic Polymer DG") is prepared according to the procedure used to prepare Acrylic Polymer DB above with the following changes: the total amount of methyl methacrylate is increased to 177 g and the total amount of BA is decreased to 120 g.

The resulting dispersion has a solids content of 51.2 wt %, an average particle size of 158 nm, a Tg of 33.7° C., a pH of 9.2, and contains 0.10% volatile base based on total weight of dispersion. The composition of the polymer particles in the dispersion is 40.0 wt % butyl acrylate, 59.0 wt % methyl methacrylate and 1.0 wt % methacrylic acid. The dispersion contains 0.51 wt % sodium dodecylbenzenesulfonate.

General Procedures for Producing Siloxanes
General Procedure for Producing an Aqueous Amino Functional Siloxane SA An aqueous amino functional siloxane (herein designated as "Siloxane SA") is prepared by hydrolysis-condensation polymerization in a 200 milliliters (mL) round bottom reaction flask equipped with a magnetic stirrer. To the reaction flask, 3.3 g of 3-(2-aminoethylamino)propyldimethoxymethylsilane, 12.8 g of 3-(2-aminoethylamino)propyltrimethoxysilane, 6.5 g of 2-[methoxy(polyethyleneoxy)9-12propyl]trimethoxysilane and 2.0 g of dimethoxydimethylsilane is added. Then, the contents of the flask is stirred. A 100 mL addition funnel is equipped to the flask and 25.0 g of deionized water is added to the flask at a rate of 0.5 milliliters per minute (mL/min). After the water addition is completed, the mixing is maintained for one hr. The flask is then transferred to a rotary evaporator and the solution in the flask is concentrated under reduced pressure. The resulting amino functional siloxane solution has a solids content of 47.7%. The composition of the siloxane polymer is 16.5 mol % 3-(2-aminoethylamino)-propyldimethoxymethylsilane, 57.1 mol % 3-(2-aminoethylamino)propyltrimethoxysilane, 9.8 mol % 2-[methoxy(polyethyleneoxy)9-12propyl]tri-methoxysilane and 16.5% dimethoxydimethylsilane.

General Procedure for Producing an Aqueous Amino Functional Siloxane SB

An aqueous amino functional siloxane (herein designated as "Siloxane SB") is prepared using the above procedure for preparing Siloxane SA except that 0.0 g of 3-(2-aminoethylamino)-propyldimethoxymethylsilane, 12.5 g of 3-(2-aminoethylamino)propyltrimethoxysilane and 10.5 g of 2-[methoxy(polyethyleneoxy)9-12propyl]trimethoxysilane are added to the flask. The resulting amino functional siloxane solution has a solids content of 47.2%. The composition of the siloxane polymer is 63.3 mol % 3-(2-aminoethylamino)propyltrimethoxysilane, 18.0 mol % 2-[methoxy(polyethyleneoxy)9-12propyl]trimethoxysilane, and 18.7 mol % dimethoxydimethylsilane.

General Procedure for Producing an Aqueous Amino Functional Siloxane SC

An aqueous amino functional siloxane (herein designated as "Siloxane SC") is prepared using the above procedure for preparing Siloxane SA except that no 3-(2-aminoethylamino)propyltrimethoxysilane and dimethoxydimethylsilane are added to the flask. Instead, 22.5 g of 3-(2-aminoethylamino)-propyldimethoxymethylsilane and 5.0 g of 2-[methoxy(polyethyleneoxy)9-12propyl]trimethoxysilane are added to the flask. The resulting amino functional siloxane solution has a solids content of 49.3%. The composition of the siloxane polymer is 93.0 mol % 3-(2-aminoethylamino)propyldimethoxymethylsilane and 7.0 mol % 2-[methoxy(polyethyleneoxy)9-12propyl]trimethoxysilane.

General Procedure for Producing an Aqueous Amino Functional Siloxane SD

An aqueous amino functional siloxane (herein designated as "Siloxane SD") is prepared using the above procedure for preparing Siloxane SA except that 25.0 g of aminopropyltriethoxysilane is used in place of all other silane monomers. The resulting amino functional siloxane solution has a solids content of 49.8%. The composition of the siloxane polymer is 100 mol % aminopropyltriethoxysilane.

General Procedure for Producing an Aqueous Amino Functional Siloxane SE

An aqueous amino functional siloxane (herein designated as "Siloxane SE") is prepared using the above procedure for preparing Siloxane SA except that all silane monomers are replaced with 27.5 g of 3-(2-aminoethylamino)propyltrimethoxysilane and 27.5 g of aminopropyltriethoxysilane, and 50.0 g of water is added. The resulting amino functional siloxane solution has a solids content of 44.0%. The composition of the siloxane polymer is 49.9 mol % of 3-(2-aminoethylamino)propyltrimethoxysilane and 50.1 mol % of aminopropyltriethoxysilane.

General Procedure for Producing an Aqueous Amino Functional Siloxane SF

An aqueous amino functional siloxane (herein designated as "Siloxane SF") is prepared using the above procedure for preparing Siloxane SA except that 25.0 g of aminopropyldimethoxymethylsilane is used in place of all other silane monomers. The resulting amino functional siloxane solution has a solids content of 43.7%. The composition of the siloxane polymer is 100 mol % aminopropyldimethoxymethylsilane.

General Procedure for Producing an Aqueous Amino Functional Siloxane SG

An aqueous amino functional siloxane (herein designated as "Siloxane SG") is prepared using the above procedure for preparing Siloxane SA except that no 3-(2-aminoethylamino)propyltrimethoxysilane is added and in place add 22.5 g of 3-(2-aminoethylamino)propyldimethoxymethylsilane, 2.3 g of dimethoxydimethylsilane and 5.0 g 2-[methoxy(polyethyleneoxy)9-12propyl]trimethoxysilane. The resulting amino functional siloxane solution has a solids content of 48.0%. The composition of the siloxane polymer is 82.0 mol % 3-(2-aminoethylamino)propyldimethoxymethylsilane, 3.0 mol % 2-[methoxy(polyethyleneoxy)9-12propyl]trimethoxysilane and 15.0% dimethoxydimethylsilane.

General Procedure for Producing an Aqueous Amino Functional Siloxane SH

An aqueous amino functional siloxane (herein designated as "Siloxane SH") is prepared using the above procedure for preparing Siloxane SA except that all monomers are replaced with 39.1 g of 3-aminopropyldiethoxymethylsilane and 10.1 g of 2-[methoxy(polyethyleneoxy)9-12 propyl]-trimethoxysilane, and 50.0 g of water is added. The resulting amino functional siloxane solution has a solids content of 43.0%. The composition of the siloxane polymer is 93.0 mol % 3-aminopropyldiethoxymethylsilane and 7.0 mol % of 2-[methoxy(polyethyleneoxy)9-12propyl]trimethoxysilane.

General Procedure for Producing an Aqueous Amino Functional Siloxane SI

An aqueous amino functional siloxane (herein designated as "Siloxane SI") is prepared using the above procedure for preparing Siloxane SA except that 33.8 g of 3-aminopropyldiethoxymethylsilane and 21.2 g of dimethoxydimethylsilane are added in place of all other silane monomers, and 50.0 g of water is added. The resulting amino functional siloxane solution has a solids content of 60.0%. The composition of the siloxane polymer is 50 mol % 3-aminopropyldiethoxymethylsilane and 50 mol % dimethoxydimethylsilane.

General Procedure for Producing an Aqueous Amino Functional Siloxane SJ

An aqueous amino functional siloxane (herein designated as "Siloxane SJ") is prepared as example SA except 25.0 g of 3-(2-aminoethylamino)propyltrimethoxysilane is used in place of all other silane monomers. The resulting amino functional siloxane solution has a solids content of 48.0%. The composition of the siloxane polymer is 100 mol % of 3-(2-aminoethylamino)propyltrimethoxysilane.

General Procedure for Producing an Aqueous Amino Functional Siloxane SK

An aqueous amino functional siloxane (herein designated as "Siloxane SK") is prepared using the above procedure for preparing Siloxane SA except that all monomers are replaced with 39.1 g of 3-aminopropyldiethoxymethylsilane, 10.1 g of 2-[methoxy(polyethyleneoxy)9-12propyl] trimethoxysilane, and 8.7 g of dimethyldimethoxysilane, and 50.0 g of water is added. The resulting amino functional siloxane solution has a solids content of 48.30%. The composition of the siloxane polymer is 73.0 mol % 3-aminopropyldiethoxymethylsilane, 5.3 mol % of 2-[methoxy(polyethyleneoxy)9-12propyl]trimethoxysilane, and 24.7% dimethyldimethoxy-silane.

General Procedures for Producing Acrylic Coatings
General Procedure for Producing an Acrylic Coating CA An acrylic coating that contains no ammonia or volatile base (herein designated "Acrylic Coating CA") is prepared by sequentially adding into a 1 liter container the following: 73.2 g of deionized water, 3.0 g of polyacid pigment dispersant that is 30% solids and free of ammonia and formaldehyde (for example, TAMOL™ 851 dispersant; TAMOL is a trademark of Rohm and Haas Company), 0.9 g of defoamer (for example DEE FO™ 1015; DEE FO is a trademark of Munzing Group), 268.2 g of ground calcium carbonate filler having a median particle size of 12 microns (for example SNOWHITE™ 12 calcium carbonate; SNOWHITE is a trademark of Omya group) and 45.0 g titanium dioxide pigment (for example Ti-Pure™ R-960, Ti-Pure is a trademark of The Chemours Company, TT, LLC). The above components are mixed together for 20 min using a 6.4 cm Cowels saw-tooth dispersing blade operating at 1,500 revolutions per minute (RPM). The mixing speed is then reduced to 350 RPM. To the container is added 303.2 g of Acrylic Polymer DA and 3.6 g of coalescent (for example 2,2,4-Trimethyl-1,3-Pentanediol Monoisobutyrate, UCAR™ Filmer IBT, UCAR™ is a trademark of The Dow Chemical Company). In a separate container a rheology modifier premixture is prepared by combining 8.4 g of propylene glycol with 1.1 g high molecular weight hydroxyethyl methyl cellulose CAS #9032-42-2 (for example WALOCEL™ MT 30000 PV, WALOCEL is a trademark of The Dow Chemical Company). The rheology modifier premixture is then added to the container and the contents of the container is mixed at 350 RPM for 10 min. The resulting formulation has a solids content of 65.7 wt % and a pH of 7.9. The formulation is free of ammonia and volatile amines.

General Procedure for Producing an Acrylic Coating CB

An acrylic coating which has a higher pH than Acrylic Coating CA prepared as described above and which contains ammonia (herein designated as "Acrylic Coating CB") is prepared according to the above procedure used to prepare Acrylic Coating CA except that 70.8 g of deionized water is added to the formulation and the dispersion is replaced with 305.6 g of Anionic Dispersion of Acrylic Polymer DB. The resulting formulation has a solids content of 65.7 wt % and a pH of 9.0. The formulation contains 0.05% ammonia based on total weight of the coating.

General Procedure for Producing an Acrylic Coating CC

An acrylic coating which has a higher pH than Acrylic Coating CA, contains ammonia, has a polymer dispersion with particles of a larger particle size, and has a lower glass transition temperature (herein designated as "Acrylic Coating CC") is prepared according to the above procedure used to prepare Acrylic Coating CA except that 80.6 g of deionized water is added to the formulation and the dispersion of Prep. Ex. 1 is replaced with 295.8 g of Anionic Dispersion of Acrylic Polymer DD is added to the formulation. The resulting formulation has a solids content of 65.7 wt % and a pH of 9.0. The formulation contains 0.06% ammonia based on total weight of the coating.

INVENTIVE EXAMPLES

Inventive Example 1

In this Inventive Example (Inv. Ex.) 1, a composition of the present invention is prepared using a neutral pH binder that contains no ammonia or volatile base. No pigments, fillers or other coating formulation ingredients are used to prepare the composition in this Inv. Ex. 1. The composition of Inv. Ex. 1 is prepared by adding 50 g of Dispersion of Acrylic Polymer DA to a 100 mL container. Then, using a pipet, 1.09 g of Aqueous Amino Functional Siloxane SA is added into the container. The siloxane (Siloxane SA) is homogenized into the dispersion (Acrylic Polymer DA) using a 15.2 cm tongue depressor by mixing the ingredients in the container for approximately 30 seconds (s). The tongue depressor is removed and the mixture is defoamed by allowing the container to rest for approximately 5 min. Inv. Ex. 1 contains 2.0% aminosiloxane on dry weight binder. Inv. Ex. 1 has a set time of 113 min and an NPIRI value of <1.

Inventive Example 2

In this Inv. Ex. 2, a composition of the present invention is prepared using the above procedure as described in Inv. Ex. 1 except that the amount of Siloxane SA of Inv. Ex. 1 is increased to a total of 2.15 g so as to further accelerate the set time. Inv. Ex. 2 contains 4.0% aminosiloxane on dry weight binder. Inv. Ex. 2 has a set time of 43 min and an NPIRI value<1.

Inventive Example 3

In this Inv. Ex. 3, a composition of the present invention is prepared using a neutral pH coating that contains no ammonia or volatile base. Inv. Ex. 3 is prepared using the above procedure as described in Inv. Ex. 1 by adding 50 g of Acrylic Coating CA to a 100 mL container. Then, using a pipet, 0.42 g of Aqueous Amino Functional Siloxane SA is added into the container. The siloxane is homogenized into the dispersion using a 15.2 cm tongue depressor by mixing the contents of the container for approximately 30 seconds. The tongue depressor is removed and the mixture is defoamed by allowing the container to rest for approximately 5 min Inv. Ex. 3 contains 1.8% aminosiloxane on dry weight binder. Inv. Ex. 3 has a set time of 89 min and an NPIRI value of 7.

Inventive Example 4

In this Inv. Ex. 4, a composition of the present invention is prepared using the above procedure as described in Inv. Ex. 3 except that the amount of Aqueous Amino Functional Siloxane SA is increased to a total of 0.66 g so as to further accelerate the set time. Inv. Ex. 4 contains 2.9% aminosiloxane on dry weight binder. Inv. Ex. 4 has a set time of 72 min and an NPIRI value of 7.

Inventive Example 5

In this Inv. Ex. 5, a composition of the present invention is prepared using a pH 9 coating that contains a volatile base. The aqueous amino functional siloxane in this Inv. Ex. 5 requires less sterically stabilizing monomer with an increase in pH. Inv. Ex. 5 is prepared using the above procedure as described in Inv. Ex. 3 except that Acrylic Coating CA is replaced with Acrylic Coating CB and Siloxane SA is replaced with 0.25 g Siloxane SC. Inv. Ex. 5 contains 1.1% aminosiloxane on dry weight binder. Inv. Ex. 5 has set time of 51 min and an NPIRI value of 7.

Inventive Example 60

In this Inv. Ex. 6, a composition of the present invention is prepared in a coating formulation that contains a dispersion with a lower glass transition acrylic polymer and that contains larger particles. Inv. Ex. 6 is prepared using the above procedure as described in Inv. Ex. 3 except that Acrylic Coating CA is replaced with Acrylic Coating CC and 0.16 g Siloxane SA is added to the formulation. Inv. Ex. 6 contains 0.7% aminosiloxane on dry weight binder. Inv. Ex. 6 has set time of 128 min and an NPIRI value of 7.

Inventive Example 7

In this Inv. Ex. 7, a composition of the present invention is prepared in a coating formulation with ammonia where the aminosiloxane contains a low mol % of ethoxylated silane. Inv. Ex. 7 is prepared using the above procedure as described in Inv. Ex. 3 except that Acrylic Coating CA is replaced with Acrylic Coating CB and 0.25 g of a 29% solution of ammonium hydroxide in water is mixed into Acrylic Coating CB to increase the pH to 9.7 prior to addition of the aminosiloxane. And, Siloxane SA is replaced with 0.22 g of Siloxane SG. Inv. Ex. 7 contains 1.0% aminosiloxane on dry weight binder. Inv. Ex. 7 has set time of 39 min and an NPIRI value of 7. The formulation contains 0.19% ammonia based on total weight of the coating.

Inventive Example 8

In this Inv. Ex. 8, a composition of the present invention is prepared in a dispersion containing a fatty alcohol ether sulfate surfactant. Inv. Ex. 8 is prepared according to the procedure used to prepare Inv. Ex. 1 except that Acrylic Polymer DA is replaced with Acrylic Polymer DE and 0.21 g of Siloxane SA is added to the formulation. Inv. Ex. 8 contains 0.4% aminosiloxane on dry weight binder. Inv. Ex. 8 has a set time of 174 min and an NPIRI value of <1.

Inventive Example 9

In this Inv. Ex. 9, a composition of the present invention is prepared using the primary amine group aminopropyl on the silane monomer. Inv. Ex. 9 is prepared using the above procedure as described in Inv. Ex. 3 except that Acrylic Coating CA is replaced with Acrylic Coating CC and the amino silane is replaced with 0.13 g of Siloxane SH is added to the formulation. Inv. Ex. 9 contains 0.6% aminosiloxane on dry weight binder. Inv. Ex. 9 has set time of 95 min and an NPIRI value of 7.

Inventive Example 10

In this Inv. Ex. 10, a composition of the present invention is prepared according to the procedure used to prepare Inv. Ex. 1 except that Dispersion DA is replaced with Dispersion DF which contains phosphoric acid 2-hydroxyethyl methacrylate ester. In this Inv. Ex. 10, 50.0 g of Dispersion DF is mixed with a total of 0.64 g of Aqueous Amino Functional Siloxane SA. This Inv. Ex. 10 contains 1.3% aminosiloxane on dry weight binder. Inv. Ex. 10 has a set time of 46 min and an NPIRI value of <1.

Inventive Example 11

In this Inv. Ex. 11, a composition of the present invention is prepared according to the procedure used to prepare Inv. Ex. 1 except that Acrylic Polymer DA is replaced with Acrylic Polymer DG which contains a polymer with higher glass transition temperature. Coalescent is added to the formulation to reduce the filming temperature to below ambient temperature. In this Inv. Ex. 11, 50.0 g of Dispersion DG is mixed with 2.0 g of Texanol and a total of 0.50 g of Siloxane SA. Inv. Ex. 11 contains 0.9% aminosiloxane on dry weight binder. Inv. Ex. 11 has a set time of 96 min and an NPIRI value of <1.

Inventive Example 12

In this Inv. Ex. 12, a composition of the present invention is prepared using a primary amine group aminopropyl on a silane monomer at a lower concentration. Inv. Ex. 12 is prepared using the above procedure as described in Inv. Ex. 3 except that Acrylic Coating CA is replaced with Acrylic Coating CC and the aminosiloxane is replaced with 0.22 g of Siloxane SK added to the formulation. Inv. Ex. 12 contains 0.9 aminosiloxane on dry weight binder. Inv. Ex. 12 has set time of 108 min and an NPIRI value of 7.

Inventive Example 13

In this Inv. Ex. 13, a composition of the present invention is prepared using a formulation containing and aqueous polymer dispersion of polysiloxane particles. Inv. Ex. 13 is prepared using the above procedure as described in Inv. Ex. 3 except that Acrylic Coating CA is replaced with Acrylic Coating CC, 1.0 g Dow Corning IE-6683 Emulsion is mixed into Acrylic Coating CC prior to addition of aminosiloxane, and 0.40 g total of Siloxane SA is added to the formulation. Dow Corning IE-6683 Emulsion is a 40% active non-ionic silane-siloxane based emulsion. Inv. Ex. 13 contains 0.6% aminosiloxane on dry weight binder. Inv. Ex. 13 has a set time of 85 min and an NPIRI value of 7.

Inventive Example 14

In this Inv. Ex. 14, a composition of the present invention is prepared using a formulation containing and aqueous polymer dispersion of polyethylene particles. Inv. Ex. 14 is prepared using the above procedure as described in Inv. Ex. 3 except that Acrylic Coating CA is replaced with Acrylic Coating CC; 1.0 g of Michem Emulsion 62330 is mixed into Acrylic Coating CC prior to addition of aminosiloxane; and 0.43 g total of Siloxane SA is added to the formulation. Michem® Emulsion 62330 is a 30% solids anionic paraffin/polyethylene coemulsion. Inv. Ex. 14 contains 0.6% aminosiloxane on dry weight binder.
Inv. Ex. 14 has a set time of 82 min and an NPIRI value of 7.

Inventive Example 15

In this Inv. Ex. 15, a composition of the present invention is prepared using a dispersion containing an aqueous polyurethane polymer dispersion. Inv. Ex. 15 is prepared using the above procedure as described in Inv. Ex. 1 except that: the dispersion of Inv. Ex. 1 is replaced with Acrylic Polymer DB; 5.0 g of Witcobond 418-49 is mixed into Acrylic Polymer DB prior to addition of aminosiloxane; and 1.0 g total of Siloxane SA is added to the formulation. Witcobond 418-49 is a 60% solid, aqueous, aliphatic type, polyester polyurethane dispersion with anionic stabilization. Inv. Ex. 15 contains 1.8% aminosiloxane on dry weight binder. Inv. Ex. 15 has a set time of 120 min and an NPIRI value of <1.

COMPARATIVE EXAMPLES

Comparative Example A

This Comparative Example (Comp. Ex.) A is a control experiment which tests the setting and the fineness of the dispersion of Acrylic Polymer DA without the addition of an aminosiloxane. No pigments, fillers or other coating formulation ingredients are used in this Comp. Ex. A. The composition of Comp. Ex. A is prepared using the above procedure as described in Inv. Ex. 1 except that no Siloxane SA is added which increases the time to set Acrylic Polymer DA. Comp. Ex. A contains 0.0% aminosiloxane on dry weight binder. Comp. Ex. A has a set time of 263 min and an NPIRI value of <1.

Comparative Example B

This Comp. Ex. B is a control experiment which tests the setting and the fineness of Acrylic Coating CA without the addition of an aminosiloxane. Comp. Ex. B is prepared using the above procedure as described in Inv. Ex. 3 except that no Siloxane SA is added which increases the time to set Acrylic Coating CA. Comp. Ex. B contains 0.0% aminosiloxane on dry weight binder. Comp. Ex. B has a set time of 157 min and an NPIRI value of 7.

Comparative Example C

This Comp. Ex. C uses an aminosiloxane with a composition that does not accelerate setting of Acrylic Polymer DA. Comp. Ex. C is prepared using the above procedure as described in Inv. Ex. 1 except that Siloxane SA is replaced with 0.33 g of Aqueous Amino Functional Siloxane SB. Comp. Ex. C contains 0.6% aminosiloxane on dry weight binder. Comp. Ex. C has a set time of 258 min and an NPIRI value of <1.

Comparative Example D

This Comp. Ex. D uses an aminosiloxane with a composition that does not accelerate setting of Acrylic Coating CA. Comp. Ex. D is prepared using the above procedure as described in Inv. Ex. 3 except that Siloxane SA is replaced with 0.39 of Siloxane SB. Comp. Ex. D contains 1.7% aminosiloxane on dry weight binder. Comp. Ex. D has a set time of 153 min and an NPIRI value of 7.

Comparative Example E

This Comp. Ex. E is a control experiment which tests the setting and the fineness of Acrylic Coating CB without the addition of an aminosiloxane. Comp. Ex. E is prepared using the above procedure as described in Inv. Ex. 3 except that Acrylic Coating CA is replaced with Acrylic Coating CB and no Siloxane SA is added to the formulation which increases the time to set Acrylic Coating CB. Comp. Ex. E contains 0.0% aminosiloxane on dry weight binder. Comp. Ex. E has a set time of 174 min and an NPIRI value of 7.

Comparative Example F

This Comp. Ex. F is a control experiment which tests the setting and the fineness of Acrylic Polymer DB without the addition of aminosiloxane. No pigments, fillers or other coating formulation ingredients are used in this Comp. Ex. F. Comp. Ex. F is prepared using the above procedure as described in Inv. Ex. 1 except that the dispersion of Inv. Ex. 1 is replaced with Acrylic Polymer DB and no Siloxane SA is added to the formulation; this increases the time to set Acrylic Polymer DB. Comp. Ex. F contains 0.0% aminosiloxane on dry weight binder. Comp. Ex. F has a set time of 244 min and an NPIRI value of <1.

Comparative Example G

This Comp. Ex. G demonstrates the need for an acid monomer in the composition of an acrylic polymer dispersion. Without this acid monomer, a gel is formed when combining an aminosiloxane with the dispersion. Comp. Ex. G is prepared using the above procedure as described in Inv. Ex. 1 except that the Acrylic Polymer DA is replaced with 50.0 g of Acrylic Polymer DC and 0.53 g of Siloxane SA is added. Comp. Ex. G contains 1.0% aminosiloxane on dry weight binder. Comp. Ex. G has an NPIRI value of >20 as significant gel and agglomerations are formed when mixing the aminosiloxane into the dispersion.

Comparative Example H

This Comp. Ex. H further demonstrates the need for an acid monomer in a composition of an acrylic polymer dispersion. Additional ammonia is added to the dispersion to increase the pH. Even with a higher pH dispersion, without the acid monomer, gel is formed when combining an aminosiloxane with the dispersion. Comp. Ex. H is prepared using the above procedure as described in Comp. Ex. G except that 0.25 g of ammonia is added to the dispersion of Comp. Ex. G to increase the pH to 10.3 prior to addition of a total of 0.33 g of Siloxane SA. Comp. Ex. H contains 0.6% aminosiloxane on dry weight binder. Comp. Ex. H has an NPIRI value of >20 as significant gel and agglomerations are formed when mixing the aminosiloxane into the dispersion.

Comparative Example I

This Comp. Ex. I is a control experiment which tests the setting and the fineness of Acrylic Coating CC without the addition of an aminosiloxane. Comp. Ex. I is prepared using the above procedure as described in Inv. Ex. 3 except that Acrylic Coating CA is replaced with Acrylic Coating CC and no Siloxane SA is added to the formulation which increases the time to set Acrylic Coating CC. Comp. Ex. I contains 0.0% aminosiloxane on dry weight binder. Comp. Ex. I has a set time of 212 min and an NPIRI value of 7.

Comparative Example J

This Comp. Ex. J tests a coating with an aminosiloxane homopolymer which does not contain an ethoxylated silane. Comp. Ex. J is prepared using the above procedure as described in Inv. Ex. 3 except that Acrylic Coating CA is replaced with Acrylic Coating CC and Siloxane SA is replaced with 0.22 g of Siloxane SD. Comp. Ex. J contains 1.0% aminosiloxane on dry weight binder. Comp. Ex. J has an NPIRI value of >20 as significant agglomerations are formed when mixing the aminosiloxane into the dispersion.

Comparative Example K

This Comp. Ex. K tests a coating with an aminosiloxane copolymer which does not contain an ethoxylated silane. Comp. Ex. K is prepared using the above procedure as described in Inv. Ex. 3 except that Acrylic Coating CA is replaced with Acrylic Coating CC and Siloxane SA is replaced with 0.30 g of Siloxane SE. Comp. Ex. K contains 1.2% aminosiloxane on dry weight binder. Comp. Ex. K has an NPIRI value of >20 as significant agglomerations are formed when mixing the aminosiloxane into the dispersion.

Comparative Example L

This Comp. Ex. L tests a coating with an aminosiloxane copolymer which does not contain an ethoxylated silane, and ammonia is added to increase the formulation pH to 10.7. Comp. Ex. L is prepared using the above procedure as described in Inv. Ex. 3 except that Acrylic Coating CA is replaced with Acrylic Coating CC; 0.45 g of a 29% solution of ammonium hydroxide in water is mixed into Acrylic Coating CC before the addition of aminosiloxane to increase pH to 10.7, and Siloxane SA is replaced with 0.30 g of Siloxane SF. Comp. Ex. L contains 1.2% aminosiloxane on dry weight binder. Comp. Ex. L has an NPIRI value of >20 as significant agglomerations are formed when mixing the aminosiloxane into the dispersion.

Comparative Example M

This Comp. Ex. M tests a coating with a large added charge of ammonia, but is still insufficient to stabilize the formulation to flocculation due to the presence of an aminosiloxane homopolymer which does not contain an ethoxylated silane. Comp. Ex. M is prepared using the above procedure as described in Inv. Ex. 3 except that Acrylic Coating CA is replaced with Acrylic Coating CC and 2.1 g of a 29% solution of ammonium hydroxide in water is mixed into Acrylic Coating CC to increase the pH to 11.2 prior to addition of the aminosiloxane. And, Siloxane SA is replaced with 0.21 g of Siloxane SF. Comp. Ex. M contains 0.9% aminosiloxane on dry weight binder. Comp. Ex. M has an NPIRI value of 18 indicating micro-agglomerations are formed when mixing the aminosiloxane into the dispersion. The formulation contains 1.27% ammonia based on total weight of the coating.

Comparative Example N

This Comp. Ex. N is a control experiment which tests the setting and the fineness of Acrylic Polymer DE without the addition of aminosiloxane. No pigments, fillers or other coating formulation ingredients are used in this Comp. Ex. N. Comp. Ex. N is prepared using the above procedure as described in Inv. Ex. 1 except that the dispersion of Inv. Ex. 1 is replaced with Acrylic Polymer DE and no Siloxane SA is added to the formulation which increases the time to set Acrylic Polymer DE. Comp. Ex. N contains 0.0% aminosiloxane on dry weight binder. Comp. Ex. N has a set time of 268 min and an NPIRI value of <1.

Comparative Example O

This Comp. Ex. O tests a coating with an aminosiloxane homopolymer as described in the above U.S. Provisional Patent Application No. 62/525,851. Comp. Ex. O is prepared using the above procedure as described in Inv. Ex. 3 except that Acrylic Coating CA is replaced with Acrylic Coating CC and Siloxane SA is replaced with 0.30 g of Siloxane SJ. Comp. Ex. O contains 1.3% aminosiloxane on dry weight binder. Comp. Ex. O has an NPIRI value of >20 as significant agglomerations are formed when mixing the aminosiloxane into the dispersion.

Comparative Example P

This Comp. Ex. P tests a coating with an aminosiloxane copolymer which does not contain an ethoxylated silane and the mol % of amino silane is reduced by the addition of a non-functional silane.

Comp. Ex. P is prepared using the above procedure as described in Inv. Ex. 3 except that Siloxane SA is replaced with 0.22 g of Siloxane SI. Comp. Ex. P contains 1.2% aminosiloxane on dry weight binder. Comp. Ex. P has a set time of 193 min and an NPIRI value of 15 indicating micro agglomerations are formed when mixing the aminosiloxane into the dispersion.

Comparative Example Q

This Comp. Ex. Q is a control experiment which tests the setting and the fineness of Acrylic Polymer DF without the addition of aminosiloxane. No pigments, fillers or other coating formulation ingredients are used in this Comp. Ex. Q. Comp. Ex. Q is prepared using the above procedure as described in Inv. Ex. 1 except that the dispersion of Inv. Ex. 1 is replaced with Acrylic Polymer DF and no Siloxane SA is added to the formulation which increases the time to set Acrylic Polymer DF. Comp. Ex. Q contains 0.0% aminosiloxane on dry weight binder. Comp. Ex. Q has a set time of 199 min and an NPIRI value of <1.

Comparative Example R

This Comp. Ex. R is a control experiment which tests the setting and the fineness of Acrylic Polymer DG without the addition of aminosiloxane. No pigments or fillers are used in Comp. Ex. R, but coalescent is added to reduce the filming temperature to below ambient. Comp. Ex. R is prepared using the above procedure as described in Inv. Ex. 1 except that the dispersion of Inv. Ex. 1 is replaced with Acrylic Polymer DG and 2.0 g of Texanol is mixed into the binder before application. No Siloxane SA is added to the formulation which increases the time to set Acrylic Polymer DG. Comp. Ex. R contains 0.0% aminosiloxane on dry weight binder. Comp. Ex. R has a set time of 168 min and an NPIRI value of <1.

Comparative Example S

This Comp. Ex. S is a control experiment which demonstrates the need to copolymerize the aminosilane monomer with the an ethoxylated silane monomer. A premix of monomers in the same mol ratio as Siloxane SC is added to Acrylic Polymer DA and the result is significant flocculation Acrylic Polymer DA. Comp. Ex. S is prepared by mixing 4.5 g of 3-(2-aminoethylamino)-propyldimethoxymethylsilane and 1.0 g of 2-[methoxy(polyethyleneoxy)9-12propyl] trimethoxysilane in a one ounce vial. In a separate container 50.0 g of Acrylic Polymer DA is mixed with 0.26 g of the silane monomer mix. Immediately upon addition large grit agglomerations are formed. Comp. Ex. S has an NPIRI value of >20 as significant agglomerations are formed when mixing the silane monomers siloxane into the dispersion. The results of testing the compositions described above in the Inventive and Comparative Examples using the test methods described above are shown in Table III.

TABLE III

Results of Testing

| Example | Binder or Coating | Siloxane | NPIRI Value | Set Time (min) |
|---|---|---|---|---|
| Inv. Ex. 1 | DA | SA | <1 | 113 |
| Inv. Ex. 2 | DA | SA | <1 | 43 |
| Comp. Ex. A | DA | None | <1 | 263 |
| Comp. Ex. C | DA | SB | <1 | 258 |
| Inv. Ex. 3 | CA | SA | 7 | 89 |
| Inv. Ex. 4 | CA | SA | 7 | 72 |
| Comp. Ex. B | CA | None | 7 | 157 |
| Comp. Ex. D | CA | SB | 7 | 153 |
| Inv. Ex. 5 | CB | SC | 7 | 51 |
| Inv. Ex. 7 | CB | SG | 7 | 39 |
| Comp. Ex. E | CB | None | 7 | 174 |
| Comp. Ex. O | CC | SJ | >20 Fail high coagulum | NA |
| Inv. Ex. 6 | CC | SA | 7 | 128 |
| Comp. Ex. I | CC | None | 7 | 222 |
| Inv. Ex. 8 | DE | SA | <1 | 174 |
| Comp. Ex. N | DE | None | <1 | 268 |
| Inv. Ex. 9 | CC | SH | 7 | 95 |
| Comp. Ex. I | CC | None | 7 | 222 |
| Inv. Ex. 10 | DF | SA | <1 | 46 |
| Comp. Ex. Q | DF | None | <1 | 199 |
| Inv. Ex. 11 | DG | SA | <1 | 96 |
| Comp. Ex. R | DG | None | <1 | 168 |
| Inv. Ex. 12 | CC | SK | 7 | 108 |
| Comp. Ex. I | CC | None | 7 | 222 |
| Inv. Ex. 13 | CC | SA | 7 | 85 |
| Inv. Ex. 14 | CC | SA | 7 | 82 |
| Inv. Ex. 15 | DA | SA | <1 | 120 |
| Comp. Ex. G | DC | SA | >20 Fail coagulum | NA |
| Comp. Ex. H | DC | SA | >20 Fail coagulum | NA |
| Comp. Ex. J | CC | SD | >20 Fail coagulum | NA |
| Comp. Ex. K | CC | SE | >20 Fail coagulum | NA |
| Comp. Ex. L | CC | SF | >20 Fail coagulum | NA |
| Comp. Ex. M | CC | SF | 18 | NA |
| Comp. Ex. P | CA | SI | 15 | 193 |

Discussion of Results

Comp. Ex. A is compared to Inv. Ex. 1 and Inv. Ex. 2 which use similar compositions with different levels of aminosiloxane. The comparison of Comp. Ex. A, Inv. Ex. 1 and Inv. Ex. 2 demonstrates that setting time is reduced by adding aminosiloxane to dispersion samples. The comparison of a dispersion without an aminosiloxane additive (Comp. Ex. A) and a dispersion with an aminosiloxane additive (Inv. Ex. 1) establishes that rapid setting can be achieved as the set time property of the dispersion is reduced. Inv. Ex. 2 further demonstrates that an even greater rapid set time for a dispersion can be achieved by increasing the concentration of aminosiloxane in the dispersion. Inv. Ex. 1 also demonstrates rapid setting in a composition that is free of volatile base.

Comp. Ex. C uses a siloxane composition outside the range of the present invention; and therefore, Comp. Ex. C is not fast setting because the amino content of the siloxane in Comp. Ex. C is low.

Comp. Ex. B is compared to Inv. Ex. 3 and Inv. Ex. 4 which use similar compositions with different levels of aminosiloxane. The comparison of Comp. Ex. B, Inv. Ex. 3 and Inv. Ex. 4 demonstrates that the setting time is reduced by adding an aminosiloxane to a dispersion formulated into a coating composition. Comp. Ex. B establishes the set time for a coating without an aminosiloxane additive and Inv. Ex.

3 which is a coating with an aminosiloxane additive demonstrates that rapid setting is achieved as the set time is reduced. Inv. Ex. 4 further demonstrates that an even greater rapid set time for a dispersion can be achieved by increasing the concentration of aminosiloxane in the dispersion.

Comp. Ex. D uses a siloxane outside the range of the present invention; and therefore, Comp. Ex. D is not fast setting because the amino content of the siloxane is low.

In Inv. Ex. 6 a dispersion with a glass transition temperature of −32° C. is used. Inv. Ex. 6 demonstrates that rapid setting can be achieved with dispersions of softer polymers having a lower glass transition temperature than the dispersion of Inv. Ex. 3.

The dispersion of Inv. Ex. 7 has a low level of polyethylene oxide and can be compared to Comp. Ex. E and Comp. Ex. O. The comparison of Inv. Ex. 7, Comp. Ex. E and Comp. Ex. O demonstrates that a pendant alkyl-poly(ethylene oxide) chain is required to achieve stability and shows a lower range for the pendant alkyl-poly(ethylene oxide) chain. Comp. Ex. E shows the set time for a dispersion without aminosiloxane. Inv. Ex. 7 demonstrates rapid setting with an aminosiloxane containing composition with low level of silicon atoms having a pendant alkyl-poly(ethylene oxide) chain. Comp. Ex. O shows that flocculation occurs when the aminosiloxane does not contain a pendant alkyl-poly(ethylene oxide) chain.

Inv. Ex. 8 uses a dispersion stabilized with a surfactant different from sodium dodecylbenzenesulfonate. Inv. Ex. 8 demonstrates that a dispersion containing surfactants other than sodium dodecylbenzenesulfonate (i.e., the surfactant used in other Inv. Ex.) can achieve rapid setting. The dispersion in Inv. Ex. 8 is stabilized with a 12 EO fatty alcohol ether sulfate such as Disponil FES-993.

The dispersion of Inv. Ex. 9 with siloxane in the compositional range of the present invention can be compared to the dispersion of Comp. Ex I which is the comparable composition without aminosiloxane.

The dispersion of Inv. Ex. 10 uses an alternative co-acid in the binder. The dispersion of Inv. Ex. 10 demonstrates that acid monomers other than methacrylic acid are suitable for the compositions of the present invention; and that the acid level in the polymer composition can be lower than the methacrylic acid present in the compositions of other Inv. Ex.

In Inv. Ex. 11, a dispersion with a glass transition temperature of 33° C. is used. The dispersion of Inv. Ex. 11 demonstrates that rapid setting can be achieved with higher temperature filming dispersions by adding a coalescent to the dispersion.

In Inv. Ex. 12, aminosiloxane SK is used and illustrates that a lower range of amino silane in the aminosiloxane can be used. The dispersion of Inv. Ex. 12 can be compared to the dispersion of Comp. Ex. I. to illustrate the difference in set time.

Comp. Ex. G and Comp. Ex. H illustrate the effect of combining aminosiloxane with a binder when no acid is present in the binder. Without an acid monomer in the binder, a significant amount of coagulum is formed immediately upon combining an aminosiloxane with the dispersions of Comp. Ex. G and Comp. Ex. H; and the dispersions are difficult to mix. In Comp. Ex. H, ammonia is added to the formulation to increase the pH of the formulation which should improve the stability of the formulation by reducing the charge of the aminosiloxane. Relative to Comp. Ex. G, the coagulum of Comp. Ex. H is reduced; however, the dispersion of Comp. Ex. H still fails because of the presence of coagulum and agglomerations in the dispersion.

The compositions of Comp. Ex. J, Comp. Ex. K, and Comp. Ex. L demonstrate the need to have a pendant alkyl-poly(ethylene oxide) chain on the aminosiloxane. When the aminosiloxane does not contain a pendant alkyl-poly(ethylene oxide) chain, a significant amount of coagulum is formed in the formulation immediately upon combining an aminosiloxane. To stabilize the formulation of Comp. Ex. L, the formulation also contains additional ammonia to increase the pH of the formulation, which in turn, reduces charge on the aminosiloxane.

Comp. Ex. M illustrates that even with the addition of a substantial amount of ammonia to a formulation, the formulation still has too much micro-flocculation. Comp. Ex. M uses a composition comparable to Comp. Ex. L except that ammonia is added to the composition to increase the pH>11 prior to addition of aminosiloxane. At a pH of >11 and dilution, the stability of the formulation (Comp. Ex. M) is improved relative to Comp. Ex. L level; however, Comp. Ex. M also demonstrates that the formulation of Comp. Ex. M needs to have a pendant alkyl-poly(ethylene oxide) chain in aminosiloxane as flocculation is increased from the control coating, Comp. Ex. I.

Comp. Ex. P illustrates the need for a pendant alkyl-poly (ethylene oxide) chain in aminosiloxane. The amino silane level in Comp. Ex. P is reduced so low that set time for the formulation of Comp. Ex. P is not improved (see e.g., Comp. Ex. D for the CA set time). Furthermore, micro-flocculation is observed in the formulation of Comp. Ex. P.

Inv. Ex. 13, Inv. Ex. 14, and Inv. Ex. 15 use formulations of the present invention with different types of polymer dispersions. For instance, Inv. Ex. 13 blends with a polysiloxane, Inv. Ex. 14 blends with a polyolefin, and Inv. Ex. 15 blends with a polyurethane dispersion.

What is claimed is:

1. A stable waterborne composition comprising:
   (a) at least one anionically stabilized acrylic polymer dispersion, wherein the acrylic polymer contains at least a portion of polymerized acid monomer units; and
   (b) at least one polyaminosiloxane copolymer-containing steric stabilizing groups, wherein (i) at least a portion of the silicon atoms in the polyaminosiloxane copolymer contain a pendant group with a secondary or a primary amine functionality; and (ii) at least a portion of the silicon atoms in the polyaminosiloxane copolymer-containing steric stabilizing groups have a pendant alkyl-poly(alkylene oxide) chain,
   wherein the portion of the polymerized acid monomer units in the acrylic polymer is from 0.1 weight-percent of more to 5.0 weight-percent of less based on the total weight of all monomers in the polymer; wherein the portion of the silicon atoms in the polyaminosiloxane copolymer containing a pendant group with a secondary or a primary amine functionality is from 60 mol % or more to 97 mol % or less based on the total of the polyaminosiloxane copolymer; and wherein the portion of the silicon atoms in the polyaminosiloxane copolymer-containing steric stabilizing groups having a pendant alkyl-poly(alkylene oxide) chain is from 3 mol % or more to 17 mol % or less based on the total of the polyaminosiloxane copolymer.

2. The composition of claim 1, wherein the alkyl-poly(alkylene oxide) chain is a poly(ethylene oxide) chain.

3. The composition of claim 1, wherein the concentration of the polyaminosiloxane copolymer-containing steric stabilizing groups is from 0.01 weight percent to 5.0 weight percent based on the total weight of the polymers in the composition.

4. The composition of claim 1, wherein (i) at least 70 mole-percent of the silicon atoms in the polyaminosiloxane copolymer-containing steric stabilizing groups have a pendant group with a secondary or a primary amine functionality; and (ii) from 5 mole-percent to 20 mole-percent of the silicon atoms in the polyaminosiloxane copolymer-containing steric stabilizing groups have a pendant alkyl-poly (ethoxide) chain with from 5 ethylene oxide units to 20 ethylene oxide units.

5. The composition of claim 1, wherein the composition has a pH in a range of from 7 to 10.5, as determined by the procedure of ASTM E70.

6. The composition of claim 1, wherein the composition is a stable mixture, wherein the fineness of said stable mixture does not increase by greater than 5 micrometers, as determined by the procedure of ASTM Test D-1316, relative to the composition without polyaminosiloxane.

7. The composition of claim 1, wherein the composition contains less than 0.25 weight percent of ammonia based on the total weight of polymer in the composition as determined by headspace gas chromatography.

8. The composition of claim 1, wherein the acrylic polymer is selected from a group consisting of (meth)acrylic polymers and styrene-acrylic copolymers.

9. The composition of claim 1, wherein the acrylic polymer comprises a monomer selected from the group consisting of acrylic acid, methacrylic acid, itaconic acid, and phosphoric acid 2-hydroxyethyl methacrylate ester.

10. The composition of claim 9, wherein the monomer is present in the composition at a concentration of from 0.1 weight-percent to 5.0 weight-percent based on total weight of monomer units in the polymer.

11. The composition of claim 1, wherein the acrylic polymer has a glass transition temperature in a range of from −55 degrees Celsius to 35 degrees Celsius, as determined according to the procedure of ASTM E-1356-08.

12. The composition of claim 1, wherein the polyaminosiloxane copolymer-containing steric stabilizing groups is the product resulting from a condensation reaction of a mixture comprising the following compounds:

(a) from 0 mole-percent to 97 mole-percent of a compound having the following structure (I):

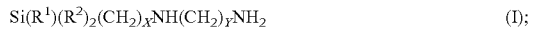

(b) from 0 mole-percent to 97 mole-percent of a compound having the following structure (II):

(c) from 0 mole-percent to 97 mole-percent of a compound having the following structure (III):

(d) from 0 mole-percent to 97 mole-percent of a compound having the following structure (IV):

(e) from 3 mole-percent to 17 mole-percent of a compound having the following structure (V):

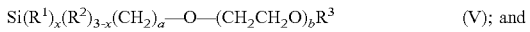

(f) from 0 mole-percent to 20 mole-percent of a compound having the following structure (VI):

wherein in the above structures (I) to (VI), $R^1$ in each occurrence is independently selected from a group consisting of methyl and phenyl; $R^2$ in each occurrence is independently selected from a group consisting of hydroxy, methoxy and ethoxy; values for x, y and a are independently selected in each occurrence from a number in a range of from 0 to 2; and b is independently selected from a number in a range of from 5 to 20; and wherein mole-percent values are relative to the total moles of compounds (a)-(f) and the sum of the mole-percent values for compounds (a)-(f) add up to 100 mole-percent; $R^3$ is hydrogen, methyl, or acetoxy; y is 0 to 3; $R^4$ is a C1 to C8 alkyl group or phenyl group.

13. The composition of claim 12, wherein the polyaminosiloxane is the product resulting from a condensation reaction of a mixture comprising the following compounds:
(a) from 0 mole-percent to 95 mole-percent of 3-(2-aminoethylamino)propyldimethoxy-methylsilane;
(b) from 0 mole-percent to 95 mole-percent of 3-(2-aminoethylamino)propyltrimethoxysilane;
(c) from 0 mol percent to 95 mol percent aminopropyldimethoxymethylsilane;
(d) from 0 mole-percent to 95 mole-percent of aminopropyltrimethoxysilane;
(e) from 3 mole-percent to 17 mole-percent of 2-[methoxy (polyethyleneoxy)9-12propyl]tri-methoxysilane; and
(f) from 0 mole-percent to 20 mole-percent of dimethoxydimethylsilane, diethoxydimethylsilane, trimethoxymethylsilane, triethoxymethylsilane;
wherein the mole-percent values are relative to the total moles of compounds (a)-(f) and the sum of the mole-percent values for compounds (a)-(f) add up to 100 mole-percent.

14. A coating, sealant, or masonry finish comprising the composition of claim 1.

* * * * *

UNITED STATES PATENT AND TRADEMARK OFFICE
CERTIFICATE OF CORRECTION

PATENT NO. : 11,629,266 B2
APPLICATION NO. : 17/274160
DATED : April 18, 2023
INVENTOR(S) : David M. Conner et al.

It is certified that error appears in the above-identified patent and that said Letters Patent is hereby corrected as shown below:

In the Claims

Claim 1, Line 49, should read "or more to 5.0 weight-percent or less based on the total"

Signed and Sealed this
Seventeenth Day of October, 2023

Katherine Kelly Vidal
*Director of the United States Patent and Trademark Office*